US010920576B2

(12) United States Patent
Benson et al.

(10) Patent No.: US 10,920,576 B2
(45) Date of Patent: Feb. 16, 2021

(54) SYSTEM AND METHOD FOR DETERMINING BHA POSITION DURING LATERAL DRILLING

(71) Applicant: Motive Drilling Technologies Inc., Dallas, TX (US)

(72) Inventors: Todd W. Benson, Dallas, TX (US); Brian E. Stokeld, Lewisville, TX (US)

(73) Assignee: MOTIVE DRILLING TECHNOLOGIES, INC., Dallas, TX (US)

( * ) Notice: Subject to any disclaimer, the term of this patent is extended or adjusted under 35 U.S.C. 154(b) by 473 days.

(21) Appl. No.: 15/364,583

(22) Filed: Nov. 30, 2016

(65) Prior Publication Data

US 2017/0081953 A1    Mar. 23, 2017

Related U.S. Application Data

(63) Continuation-in-part of application No. 15/216,946, filed on Jul. 22, 2016, now Pat. No. 10,042,081,
(Continued)

(51) Int. Cl.
*E21B 44/00*      (2006.01)
*E21B 47/04*      (2012.01)
(Continued)

(52) U.S. Cl.
CPC ............... *E21B 47/04* (2013.01); *E21B 7/04* (2013.01); *E21B 44/00* (2013.01); *E21B 47/022* (2013.01);
(Continued)

(58) Field of Classification Search
CPC .... E21B 44/00; E21B 7/04; E21B 2041/0028; E21B 44/005; E21B 41/0092; G01V 1/40; G01V 1/48; G05B 2219/2616
See application file for complete search history.

(56) References Cited

U.S. PATENT DOCUMENTS

| 2,476,136 A | 7/1949 | Doll |
| 2,742,265 A | 4/1956 | Snyder |

(Continued)

FOREIGN PATENT DOCUMENTS

| GB | 2236782 | 4/1991 |
| WO | 2009039448 | 3/2009 |

OTHER PUBLICATIONS

D.J. Lineman, J.D. Mendelson and M. N. Toksoz; "Well-to-Well Log Correlation Using Knowledge-Based Systems and Dynamic Depth Warping;" 1987; Massachusetts Institute of Technology, Earth Resources Laboratory; pp. 421-454.
(Continued)

*Primary Examiner* — Mohamed Charioui
*Assistant Examiner* — Christine Y Liao
(74) *Attorney, Agent, or Firm* — Kilpatrick Townsend & Stockton LLP

(57) ABSTRACT

A method for controlling drilling direction of a bore hole assembly (BHA) while laterally drilling through a formation involves accessing, by a surface steerable system, recent TVD corrected logging history data from a bore hole estimator, iteratively determining, by the surface steerable system, a formation bed dip of the formation being laterally drilled through, repeating the steps of accessing the recent TVD corrected logging history data and iteratively determining the formation bed dip of the formation responsive to additional well information, determining, by the surface steerable system, a most probable statistical match of a well bore positions to predicated well bore positions based on the accessed recent TVD corrected logging history data, the determined formation bed dip and the additional well information and providing, by the surface steerable system, geosteering feedback responsive to the determined most probable statistical match.

20 Claims, 27 Drawing Sheets

Related U.S. Application Data which is a continuation-in-part of application No. 15/000,104, filed on Jan. 19, 2016, now Pat. No. 9,429,676, which is a continuation of application No. 14/627,794, filed on Feb. 20, 2015, now Pat. No. 9,238,960, which is a continuation of application No. 14/332,531, filed on Jul. 16, 2014, now Pat. No. 8,977,501, which is a continuation of application No. 14/186,470, filed on Feb. 21, 2014, now Pat. No. 8,818,729.

(60) Provisional application No. 61/838,689, filed on Jun. 24, 2013.

(51) Int. Cl.
*E21B 7/04* (2006.01)
*E21B 47/022* (2012.01)
*E21B 47/09* (2012.01)
*G01V 5/12* (2006.01)
*G06F 17/40* (2006.01)

(52) U.S. Cl.
CPC ............. *E21B 47/09* (2013.01); *G01V 5/12* (2013.01); *G06F 17/40* (2013.01)

(56) References Cited

U.S. PATENT DOCUMENTS

| | | | |
|---|---|---|---|
| 2,947,971 A | 8/1960 | Glauberman et al. | |
| 3,202,761 A | 8/1965 | Bibbero | |
| RE26,014 E | 5/1966 | Stickney et al. | |
| 3,291,208 A | 12/1966 | Kenneday | |
| 3,396,786 A | 8/1968 | Schuster et al. | |
| 3,396,788 A | 8/1968 | Bell | |
| 4,794,534 A | 12/1988 | Millheim | |
| 5,193,628 A | 3/1993 | Foster | |
| 5,220,963 A | 6/1993 | Patton | |
| 5,419,405 A | 5/1995 | Patton | |
| 5,812,068 A | 9/1998 | Beimgraben et al. | |
| 6,088,294 A | 7/2000 | Balogh et al. | |
| 6,233,524 B1 | 5/2001 | Harrell et al. | |
| 6,272,434 B1 | 8/2001 | Wisler et al. | |
| 6,279,702 B1 | 8/2001 | Koh | |
| 6,389,360 B1 | 5/2002 | Alft et al. | |
| 6,408,953 B1 | 6/2002 | Goldman et al. | |
| 6,424,919 B1 | 7/2002 | Moran et al. | |
| 6,523,623 B1 | 2/2003 | Schuh | |
| 6,577,954 B2 | 6/2003 | Alft et al. | |
| 6,612,382 B2 | 9/2003 | King | |
| 6,732,052 B2 | 5/2004 | MacDonald et al. | |
| 6,749,029 B2 | 6/2004 | Alft et al. | |
| 6,929,075 B2 | 8/2005 | Benson et al. | |
| 6,950,747 B2 | 9/2005 | Byerly | |
| 7,000,710 B1 | 2/2006 | Umbach et al. | |
| 7,003,439 B2 | 2/2006 | Aldred et al. | |
| 7,011,156 B2 | 3/2006 | von Gynz-Rekowski | |
| 7,032,689 B2 | 4/2006 | Goldman et al. | |
| 7,054,750 B2 | 5/2006 | Rodney | |
| 7,085,696 B2 | 8/2006 | King | |
| 7,136,795 B2 | 11/2006 | Downtown | |
| 7,142,986 B2 | 11/2006 | Moran | |
| 7,342,504 B2 | 3/2008 | Crane | |
| 7,408,150 B1 | 8/2008 | Flaum et al. | |
| 7,460,957 B2 | 12/2008 | Prange et al. | |
| 7,606,666 B2 | 10/2009 | Repin et al. | |
| 7,653,563 B2 | 1/2010 | Meeningen et al. | |
| 7,684,929 B2 | 3/2010 | Prange et al. | |
| 7,823,655 B2 | 11/2010 | Boone et al. | |
| 7,860,593 B2 | 12/2010 | Boone et al. | |
| 7,938,197 B2 | 5/2011 | Boone et al. | |
| 7,945,488 B2 | 5/2011 | Karr et al. | |
| 8,010,290 B2 | 8/2011 | Illfelder | |
| 8,210,283 B1 | 7/2012 | Benson et al. | |
| 8,442,769 B2 | 5/2013 | Phillips et al. | |
| 8,596,382 B2 | 12/2013 | Clark et al. | |
| 8,596,385 B2 | 12/2013 | Benson et al. | |
| 8,672,055 B2 | 3/2014 | Boone et al. | |
| 8,818,729 B1 | 8/2014 | Stokeld et al. | |
| 8,977,501 B2 | 3/2015 | Benson et al. | |
| 9,091,773 B1 | 7/2015 | Selman et al. | |
| 9,347,308 B2 | 5/2016 | Benson et al. | |
| 2001/0042642 A1 | 11/2001 | King | |
| 2001/0054514 A1 | 12/2001 | Sullivan et al. | |
| 2002/0103630 A1 | 8/2002 | Aldred et al. | |
| 2002/0116129 A1 | 8/2002 | Alft et al. | |
| 2002/0139581 A1 | 10/2002 | CeJesus et al. | |
| 2003/0024738 A1 | 2/2003 | Schuh | |
| 2003/0173113 A1 | 9/2003 | Alft et al. | |
| 2004/0168811 A1 | 9/2004 | Aeschbacher et al. | |
| 2004/0243309 A1 | 12/2004 | Alft et al. | |
| 2005/0171698 A1 | 8/2005 | Sung et al. | |
| 2005/0194130 A1 | 9/2005 | Best | |
| 2005/0194185 A1 | 9/2005 | Gleitman | |
| 2005/0228590 A1 | 10/2005 | Jeffryes | |
| 2005/0267719 A1 | 12/2005 | Foucault | |
| 2006/0090934 A1 | 5/2006 | Williams | |
| 2006/0151214 A1 | 7/2006 | Prange | |
| 2008/0172272 A1 | 7/2008 | Back et al. | |
| 2009/0076873 A1 | 3/2009 | Johnson et al. | |
| 2009/0090555 A1 | 4/2009 | Boone et al. | |
| 2009/0120690 A1 | 5/2009 | Phillips | |
| 2010/0139977 A1 | 6/2010 | Watkins et al. | |
| 2010/0191516 A1 | 7/2010 | Benish et al. | |
| 2010/0259415 A1 | 10/2010 | Strachan et al. | |
| 2010/0307742 A1 | 12/2010 | Phillips et al. | |
| 2011/0067928 A1 | 3/2011 | Hulden et al. | |
| 2011/0153300 A1 | 6/2011 | Roll et al. | |
| 2012/0048621 A1 | 3/2012 | Stewart et al. | |
| 2012/0285701 A1 | 11/2012 | Cheng et al. | |
| 2013/0032401 A1 | 2/2013 | Edbury et al. | |
| 2013/0032402 A1 | 2/2013 | Byreddy et al. | |
| 2013/0092441 A1 | 4/2013 | Hummes et al. | |
| 2013/0140037 A1 | 6/2013 | Sequeira et al. | |
| 2013/0161096 A1 | 6/2013 | Benson et al. | |
| 2013/0262048 A1 | 10/2013 | Tang et al. | |
| 2013/0340999 A1 | 12/2013 | Benson | |
| 2014/0116776 A1* | 5/2014 | Marx | E21B 44/00 175/24 |
| 2014/0131102 A1 | 5/2014 | Benson et al. | |
| 2014/0231141 A1 | 8/2014 | Hay et al. | |
| 2014/0374164 A1 | 12/2014 | Benson et al. | |
| 2015/0134255 A1* | 5/2015 | Zhang | G01V 1/40 702/7 |
| 2015/0240616 A1* | 8/2015 | Woodward | G05B 15/02 700/275 |

OTHER PUBLICATIONS

Roberto H. Herrera and Mirkp van der Baan; "Automated seismic-to-well ties using dynamic time warping;" 2012; Geoconvention; Vision; pp. 1-4.

Saputelli, L. et al., "Real-Time Decision-Making for Value Creation While Drilling," SPE/IADC 85314; Middle East Drilling Technology Conference & Exhibition Held in Abu Dhabi, UAE, Oct. 20-22, 2003; 19 Pages.

Patent Cooperation Treaty: International Search Report and Written Opinion of PCT/US2014/043892; dated Oct. 23, 2014; A. Ram Jeong; 11 pages.

U.S. Appl. No. 15/428,239, "Final Office Action", dated Aug. 6, 2020, 30 pages.

EP17862195.9, "Extended European Search Report", dated Jul. 21, 2020, 9 pages.

* cited by examiner

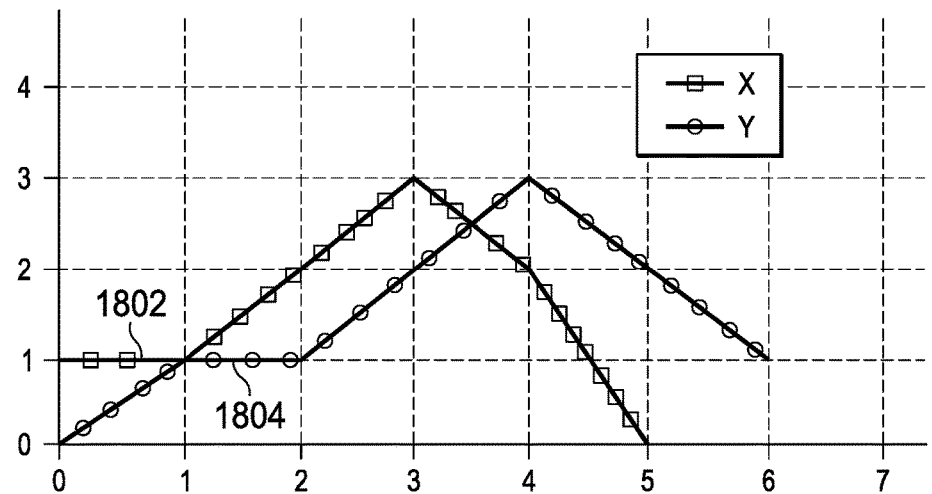
FIG. 18
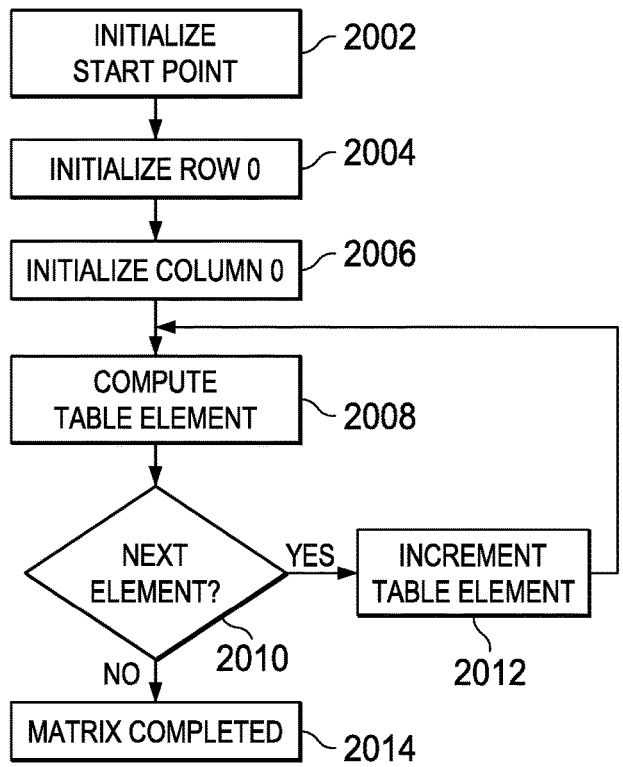
FIG. 19
FIG. 20

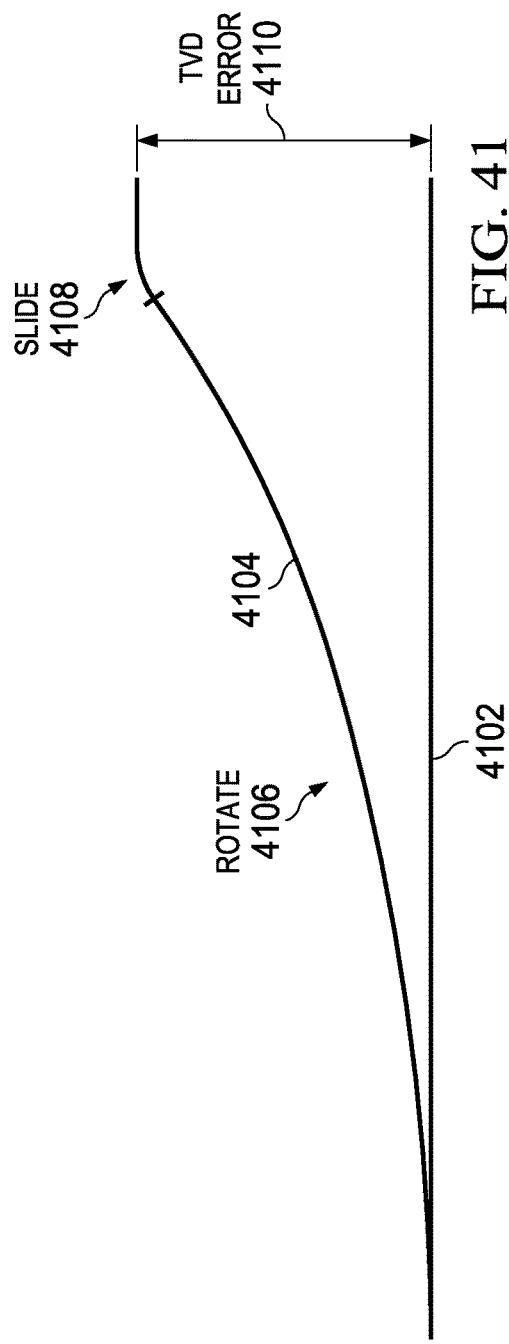
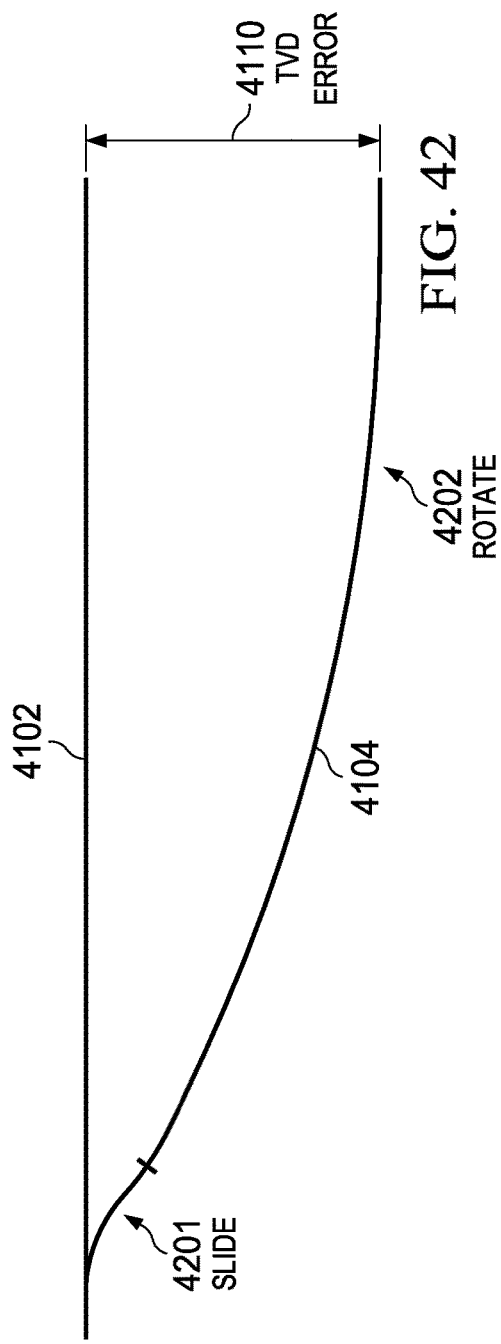
FIG. 41
FIG. 42

SYSTEM AND METHOD FOR DETERMINING BHA POSITION DURING LATERAL DRILLING

CROSS-REFERENCE TO RELATED APPLICATIONS

This application is a continuation in part of U.S. patent application Ser. No. 15/216,946, filed Jul. 22, 2016, entitled SYSTEM AND METHOD FOR DYNAMIC FORMATION DETECTION USING DYNAMIC DEPTH WARPING, which is a continuation in part of U.S. patent application Ser. No. 15/000,104 filed Jan. 19, 2016, entitled SYSTEM AND METHOD FOR FORMATION DETECTION AND EVALUATION, now U.S. Pat. No. 9,429,676, issued Aug. 30, 2016, which is a continuation of U.S. patent application Ser. No. 14/627,794, filed Feb. 20, 2015, entitled SYSTEM AND METHOD FOR FORMATION DETECTION AND EVALUATION, now U.S. Pat. No. 9,238,960, issued on Jan. 19, 2016, which is a continuation of U.S. patent application Ser. No. 14/332,531, filed Jul. 16, 2014, entitled SYSTEM AND METHOD FOR FORMATION DETECTION AND EVALUATION now U.S. Pat. No. 8,977,501, issued Mar. 10, 2015, which is a continuation of U.S. patent application Ser. No. 14/186,470, filed Feb. 21, 2014, entitled SYSTEM AND METHOD FOR FORMATION DETECTION AND EVALUATION, now U.S. Pat. No. 8,818,729, issued Aug. 26, 2014, which claims benefit of U.S. Provisional Ser. No. 61/838,689, filed on Jun. 24, 2013, and entitled SYSTEM AND METHOD FOR FORMATION DETECTION, the specifications of which are incorporated herein by reference in their entirety. The application also claims priority to U.S. Provisional Patent No. 62/410,761, filed Oct. 20, 2016, entitled SYSTEM AND METHOD FOR DETERMINING BHA POSITION DURING LATERAL DRILLING, the specification of which is incorporated herein by reference in its entirety.

TECHNICAL FIELD

The following disclosure relates to directional and conventional drilling.

BACKGROUND

Drilling a borehole for the extraction of minerals has become an increasingly complicated operation due to the increased depth and complexity of many boreholes, including the complexity added by directional drilling. Drilling is an expensive operation and errors in drilling add to the cost and, in some cases, drilling errors may permanently lower the output of a well for years into the future. Current technologies and methods do not adequately address the complicated nature of drilling. Accordingly, what is needed are a system and method to improve drilling operations.

SUMMARY

The present invention, as disclosed and described herein, in one aspect thereof comprises a method for controlling drilling direction of a bore hole assembly (BHA) while laterally drilling through a formation involves accessing, by a surface steerable system, recent TVD corrected logging history data from a bore hole estimator, iteratively determining, by surface steerable system, a formation bed dip of the formation being laterally drilled through, repeating the steps of accessing the recent TVD corrected logging history data and iteratively determining the formation bed dip of the formation responsive to additional well information, determining, by the surface steerable system, a most probable statistical match of a well bore positions to predicated well bore positions based on the accessed recent TVD corrected logging history data, the determined formation bed dip and the additional well information and providing, by the surface steerable system, geosteering feedback responsive to the determined most probable statistical match.

BRIEF DESCRIPTION OF THE DRAWINGS

For a more complete understanding, reference is now made to the following description taken in conjunction with the accompanying Drawings in which:

FIG. 18 is an example of two curves imposed on a same chart;

FIG. 19 illustrates a matrix showing distance measures between points;

FIG. 20 is a flow diagram of the process for populating the accumulated distance matrix;

FIG. 41 illustrates TVD error created between a survey plan and actual drill path;

FIG. 42 illustrates TVD error created between a survey plan and actual drill path;

DETAILED DESCRIPTION

Figure 1A:
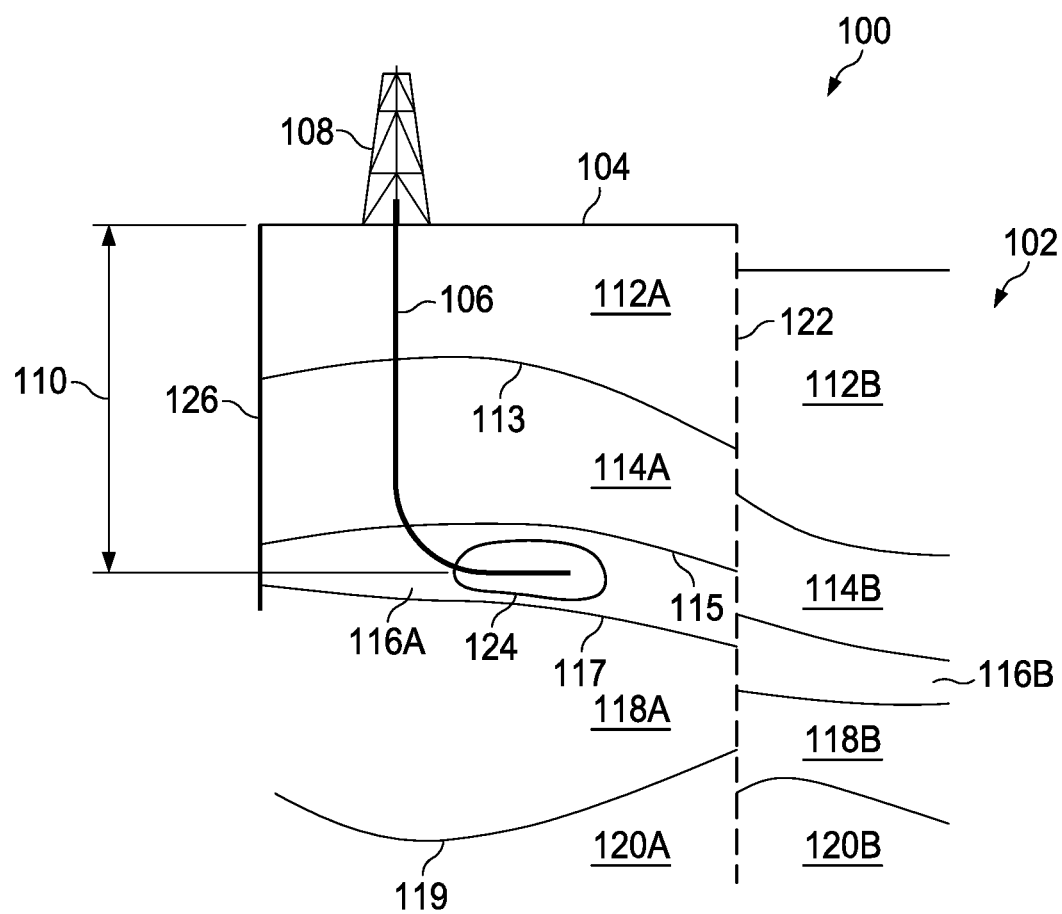
FIG. 1A illustrates one embodiment of an environment within which various aspects of the present disclosure may be implemented.

Referring now to the drawings, wherein like reference numbers are used herein to designate like elements throughout, the various views and embodiments of system and method for determining BHA position during lateral drilling are illustrated and described, and other possible embodiments are described. The figures are not necessarily drawn to scale, and in some instances the drawings have been exaggerated and/or simplified in places for illustrative purposes only. One of ordinary skill in the art will appreciate the many possible applications and variations based on the following examples of possible embodiments.

Referring to FIG. 1A, one embodiment of an environment 100 is illustrated with a formation 102 having a surface 104. A borehole 106 is to be drilled or is being drilled within the formation 102 by a drilling rig 108. A drilling plan has been formulated to drill the borehole 106 to a true vertical depth (TVD) 110. The borehole 106 is to extend through strata layers 112 and 114, stop in layer 116, and not reach underlying layers 118 and 120. Layer boundary 113 separates layers 112 and 114, layer boundary 115 separates layers 114 and 116, layer boundary 117 separates layers 116 and 118, and layer boundary 119 separates layers 118 and 120. A fault 122 has shifted a portion of each layer downwards. Accordingly, the borehole 106 is located in non-shifted layer portions 112A-120A, while portions 112B-120B represent the shifted layer portions. Although not shown, it is understood that the borehole 106 may extend past the fault 122.

The borehole 106 may be directed to a target area 124 positioned in the layer 116. The target area 124 may be a subsurface point or points defined by coordinates or other markers that indicate where the borehole 106 is to end or may simply define a depth range within which the borehole 106 is to remain (e.g., the layer 116 itself). It is understood that the target area 124 may be any shape and size, and may be defined in any way. Accordingly, the target area 124 may represent an endpoint of the borehole 106 or may extend as far as can be realistically drilled. For example, if the drilling includes a horizontal component and the goal is to follow the layer 116 as far as possible, the target may simply be the layer 116 itself and drilling may continue until a limit is reached, such as a property boundary or a physical limitation to the length of the drillstring.

One or more existing wells 126 may be present in the environment 100. The existing well 126 may be an offset well or may be another well that is located relatively close to the planned borehole 106. Formation information (e.g., gamma logs) obtained from the well 126 may be used in planning the borehole 106, as well as for purposes of evaluating the drilling plan for the borehole 106 during drilling. It is understood that the location of the well 126 relative to the borehole 106 may affect the relevancy of the formation information obtained from the borehole 106. For example, the depths of the various layer boundaries 113, 115, 117, and 119 vary depending on the location of the well 126. Generally, the closer the well 126 is to the borehole 106, the more correlation there will be in the formation characteristics of the two wells. However, some exceptions may apply, such as two wells on opposite sides of the fault line 122.

In the present embodiment, the formation information includes gamma radiation readings obtained from gamma logs, which provide a record of the radioactivity of earth materials relative to depth. Accordingly, gamma logs may be used to provide some indication as to the current location of the borehole 106 (e.g., the BHA 149 of FIG. 1B) relative to the various layer boundaries 113, 115, and 117 and layers 112, 114, and 116, and may also provide information as to the approximate location of the BHA within a particular layer due to variations in radioactivity within the layer itself.

It is understood that while gamma logs containing gamma radiation readings are used for purposes of example, the present disclosure is not limited to gamma logs and other types of information, including formation information and/or drilling operational parameters indicative of changes, may be used in the various embodiments described herein in addition to, or as an alternative to, gamma information. For example, information pertaining to resistivity, porosity, pressure, neutron density, rate of penetration (ROP), and/or mechanical specific energy (MSE) may be used. Generally, the information used needs to provide enough detail to be useful in making real time or near real time adjustments to the drilling plan. Accordingly, the resolution of the information may affect the accuracy of the processes described herein.

Figure 1B:
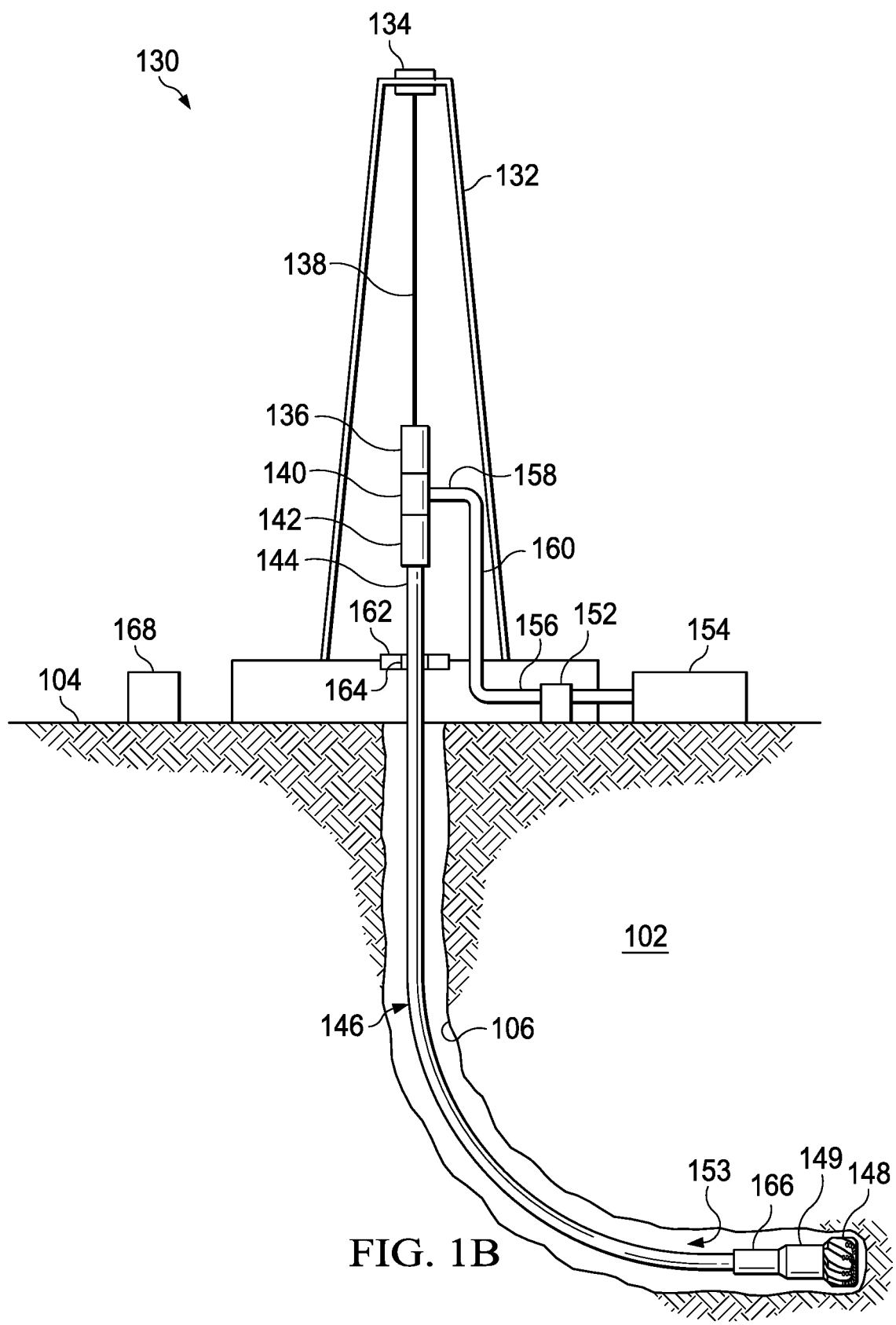
FIG. 1B illustrates one embodiment of a drilling system that may be used within the environment of FIG. 1A.

Referring to FIG. 1B, an environment 130 illustrates one embodiment of a portion of the environment 100 of FIG. 1A in greater detail. In the present example, the environment 100 includes a derrick 132 on the surface 104. The derrick 132 may be part of the drilling rig 108 of FIG. 1A. The derrick 132 includes a crown block 134. A traveling block 136 is coupled to the crown block 134 via a drilling line 138. In a top drive system (as illustrated), a top drive 140 is coupled to the traveling block 136 and provides the rotational force needed for drilling. A saver sub 142 may sit between the top drive 140 and a drill pipe 144 that is part of a drill string 146. The top drive 140 rotates the drill string 146 via the saver sub 142, which in turn rotates a drill bit 148 of a bottom hole assembly (BHA) 149 in the borehole 106 in the formation 102. A mud pump 152 may direct a fluid mixture (e.g., mud) 153 from a mud pit or other container 154 into the borehole 106. The mud 153 may flow from the mud pump 152 into a discharge line 156 that is coupled to a rotary hose 158 by a standpipe 160. The rotary hose 158 is coupled to the top drive 140, which includes a passage for the mud 153 to flow into the drill string 146 and the borehole 106. A rotary table 162 may be fitted with a master bushing 164 to hold the drill string 146 when the drill string is not rotating.

Sensing, detection, and/or evaluation functionality may be incorporated into a downhole tool 166 (which may be located in one or more positions along the drill string), BHA 149, or may be located elsewhere along the drill string 146. For example, gamma radiation sensors may be included in the downhole tool 166 and/or elsewhere along the drill string 146.

In some embodiments, formation detection and evaluation functionality may be provided via a control system 168 on the surface 104. The control system 168 may be located at the derrick 132 or may be remote from the actual drilling location. For example, the control system 168 may be a system such as is disclosed in U.S. Pat. No. 8,210,283 entitled SYSTEM AND METHOD FOR SURFACE STEERABLE DRILLING, filed on Dec. 22, 2011, and issued on Jul. 3, 2012, which is hereby incorporated by reference in its entirety. Alternatively, the control system 168 may be a stand-alone system or may be incorporated into other systems at the derrick 132. The control system 168 may receive formation information via a wired and/or wireless connection (not shown). In some embodiments, the control system 168 may use the evaluation functionality to provide convergence plans and/or other corrective measures as disclosed in U.S. patent application Ser. No. 13/530,298, entitled SYSTEM AND METHOD FOR DETERMINING INCREMENTAL PROGRESSION BETWEEN SURVEY POINTS WHILE DRILLING, and filed on Jun. 22, 2012, which is hereby incorporated by reference in its entirety.

Some or all of the control system 168 may be positioned in the downhole tool 166 or may communicate with a separate controller in the downhole tool 166.

Figure 1C:
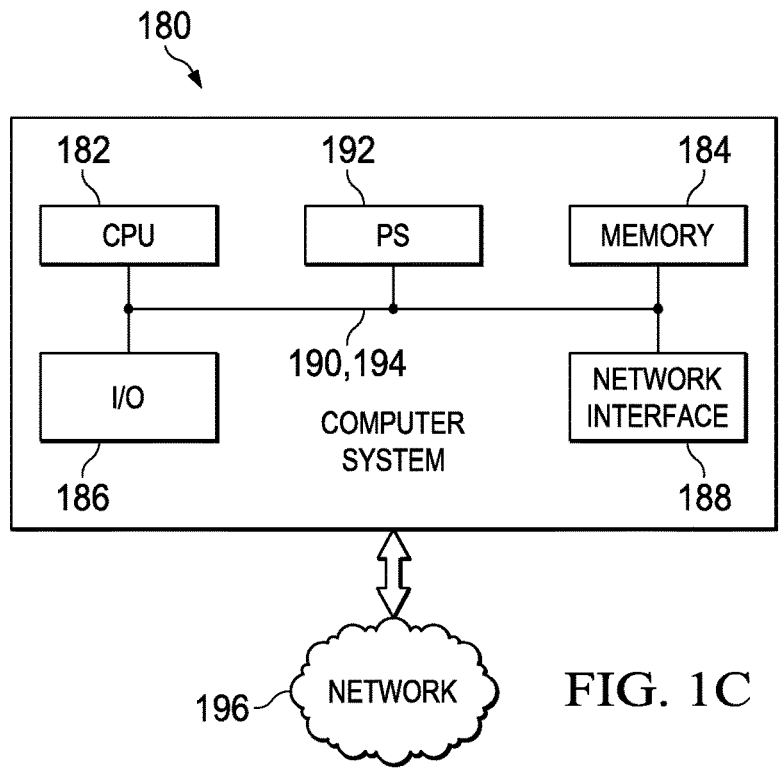
FIG. 1C illustrates one embodiment of a computer system that may be used within the environment of FIG. 1A and/or with the drilling system of FIG. 1B.

Referring to FIG. 1C, one embodiment of a computer system 180 is illustrated. The computer system 180 is one possible example of a system component or device such as the control system 168 of FIG. 1B or a separate system used to perform the various processes described herein. In scenarios where the computer system 180 is on-site, such as within the environment 100 of FIG. 1A and/or the environment 130 of FIG. 1B, the computer system may be contained in a relatively rugged, shock-resistant case that is hardened for industrial applications and harsh environments. It is understood that downhole electronics may be mounted in an adaptive suspension system or another type of dampening system.

The computer system 180 may include a central processing unit ("CPU") 182, a memory unit 184, an input/output ("I/O") device 186, and a network interface 188. The components 182, 184, 186, and 188 are interconnected by a transport system (e.g., a bus) 190. A power supply (PS) 192 may provide power to components of the computer system 180 via a power transport system 194 (shown with data transport system 190, although the power and data transport systems may be separate).

It is understood that the computer system 180 may be differently configured and that each of the listed components may actually represent several different components. For example, the CPU 182 may actually represent a multi-processor or a distributed processing system; the memory unit 184 may include different levels of cache memory, main memory, hard disks, and remote storage locations; the I/O device 186 may include monitors, keyboards, and the like; and the network interface 188 may include one or more network cards providing one or more wired and/or wireless connections to a network 196. Therefore, a wide range of flexibility is anticipated in the configuration of the computer system 180.

The computer system 180 may use any operating system (or multiple operating systems), including various versions of operating systems provided by Microsoft (such as WINDOWS), Apple (such as Mac OS X), UNIX, and LINUX, and may include operating systems specifically developed for handheld devices, personal computers, and servers depending on the use of the computer system 180. The operating system, as well as other instructions (e.g., software instructions for performing the functionality described in various embodiments described herein) may be stored in the memory unit 184 and executed by the processor 182. For example, the memory unit 184 may include instructions for performing the various methods and control functions disclosed herein.

The network 196 may be a single network or may represent multiple networks, including networks of different types. For example, the network 196 may include one or more cellular links, data packet networks such as the Internet, local area networks (LANs), and/or wide local area networks (WLAN), and/or Public Switched Telephone Networks (PSTNs). Accordingly, many different network types and configurations may be used to couple the computer system 180 to other components of the environment 100 of FIG. 1A, the environment 130 of FIG. 1B, and/or to other systems not shown (e.g., remote systems).

Figure 2:
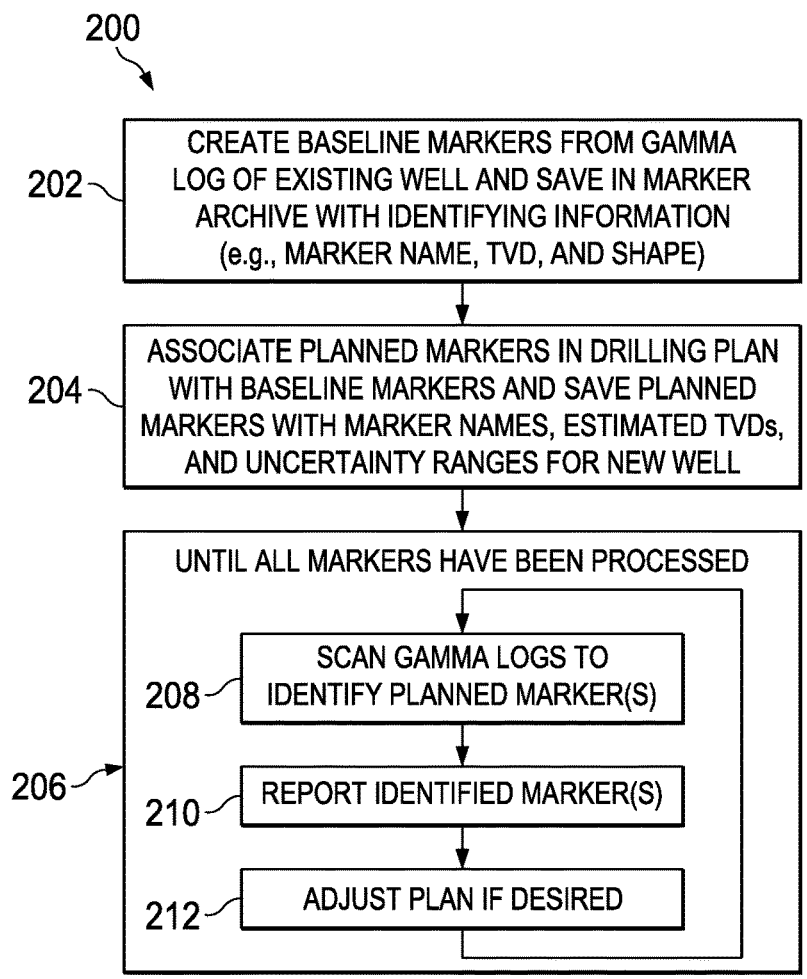
FIG. 2 illustrates a flow chart of one embodiment of a method that may be used to create baseline markers, associate the created baseline markers with planned markers, and scan for the planned markers during drilling.

Referring to FIG. 2, one embodiment of a method 200 illustrates a process that may be used to create baseline markers from formation information obtained from an existing well, associate one or more planned markers in a drilling plan with a baseline marker, identify planned markers from formation information obtained while drilling a new well, and determine whether to modify the drilling plan based on differences between the baseline markers and the planned markers. In the present example, gamma logs have been obtained from the well 126 of FIG. 1B and baseline markers from the gamma logs are used in creating or refining a drilling plan for the borehole 106. The baseline markers may also be used in evaluating the drilling plan during the drilling process.

In step 202, baseline markers are created from gamma logs obtained from the existing well 126. The baseline markers correspond to waveforms representing detected gamma values that are identifiable and distinguishable from surrounding gamma values in the logs. For example, a waveform representing a relatively significant spike in the gamma log that is surrounded by lower level readings may be selected as a baseline marker. It is understood that a baseline marker need not be a particular shape or amplitude, but may be selected at least in part based on its relation to surrounding readings.

The selection process may be performed manually by a geologist or another individual able to identify log information that would make an acceptable baseline marker (e.g., using a computer system to highlight such information and save it as a baseline marker) or may be performed automatically by a computer system. In cases where the computer system automatically identifies and saves baseline markers, a person may verify and/or modify the baseline markers at a later time. Once a particular portion of a log is identified and selected to serve as a baseline marker, the information is saved in a marker archive with corresponding data, such as name, TVD, and shape. In the present embodiment, the marker archive corresponds to the well 126, but it is understood that other storage criteria may be used in categorizing a baseline marker. For example, a baseline marker may be associated with a particular geographic area and/or a formation layer rather than with a particular well.

In step 204, planned markers are created for the drilling plan. Each planned marker is associated with a baseline marker from a marker archive, which in this example is the marker archive of the well 126. It is noted that the marker archive for the well 126 may have been created at some point in the past (e.g., for another well) and may include the original baseline markers, modified baseline markers, and/or added baseline markers. Accordingly, the marker archive may not be fixed, but may be refined over time in some cases. Information for each planned marker is entered, such as estimated TVD and an uncertainty range (e.g., plus or minus thirty feet) that may aid in minimizing or eliminating false positives. For example, if the uncertainty range is plus or minus thirty feet, there will be an uncertainty region of sixty feet. As will be described later, the uncertainty region may be used when scanning for planned markers as the borehole 106 is being drilled. While planned markers are created in step 204 in the present embodiment, it is understood that planned markers may be obtained using different methods in other embodiments, such as retrieving the planned markers from a database or automatically calculating information for a planned marker (e.g., location) as needed.

In step 206, which occurs during drilling until all markers have been processed, gamma logs are obtained and analyzed as further illustrated in sub-steps 208, 210, and 212. For example, in step 208, the gamma logs are scanned for planned markers created in step 204. The gamma logs may be obtained in real time or near real time as the formation information is gathered by downhole sensors and relayed to the surface and the log scanning may also occur in real time or near real time. In step 210, an identified planned marker is reported. This reporting may be done in real time or near real time. The real time or near real time aspect of the information gathering, scanning, and reporting enables differences between the drilling plan and the actual drilled borehole to be identified relatively quickly, thereby minimizing the time needed to correct for adjustments to the drilling plan.

In step 212, a decision may be made to adjust the drilling plan or to let drilling continue without adjustment. For example, if the planned marker is reported as being five feet lower than expected, the report may be reviewed and a decision may be made that no change is needed. However, if the planned marker is reported as being twenty feet lower than expected, the plan may be changed to compensate for this difference. For example, the TVD and/or the bed dip may be modified. It is understood that this is only an example and that many different factors may influence the decision on whether the plan is to be changed after the TVD of a planned marker is identified. This decision may occur relatively quickly following the report in order to correct the drilling plan as soon as an undesirable deviation is detected. Assuming that factors such as the timing of the report, who is monitoring the report, the authority of the person or persons monitoring the report, and the correctional capabilities of the drilling process enable corrections to be made relatively rapidly, the correction may be made before the next planned marker is found.

It is understood that processing a marker in step 206 may include skipping that marker. For example, if a marker is not identified, that marker may be skipped. A marker that coincides with a fault or another geological irregularity may simply not exist or may be so altered as to be unrecognizable. If a marker is not located and yet not skipped, the system would continue looking for that marker and miss the next marker. Such skipping may be automatic (e.g., skip a marker that is not found within fifty feet of its estimated depth) or may be manually controlled (e.g., notify a user that a marker has not been found and let the user decide whether to keep searching for the marker or skip it).

Figure 3:
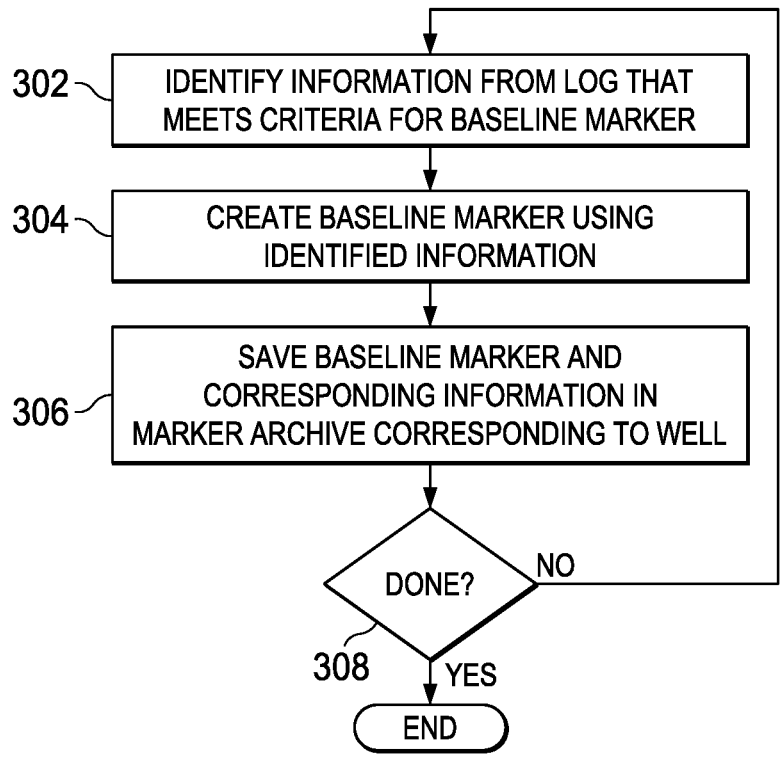
FIG. 3 illustrates a flow chart of one embodiment of a method that may be used to create baseline markers.

Referring to FIG. 3, one embodiment of a method 300 illustrates a process that may be used to identify suitable baseline markers from an existing well and store those baseline markers for later use. The method 300 may be entirely automatic (e.g., computer controlled) or may be based on user input (e.g., the selection of particular waveforms).

In step 302, information is identified from a log (e.g., a gamma log from the well 126 of FIG. 2B) that meets one or more criteria for a baseline marker. The criteria may include a minimum width and/or relative amplitude for a gamma spike, shape limitations (e.g., a spike may need to be relatively sharp rather than a gentle slope), or may need to be a shape that is readily distinguishable from other shapes. It is understood that the criteria may be relative in that a particular spike may be suitable as a baseline marker in one part of the log, but not in another part of the log. For example, a spike that is in close proximity to one or more other spikes of similar amplitude may not be suitable for a baseline marker, but a spike that is relatively isolated and/or has a significantly larger magnitude may be suitable.

Figure 4:
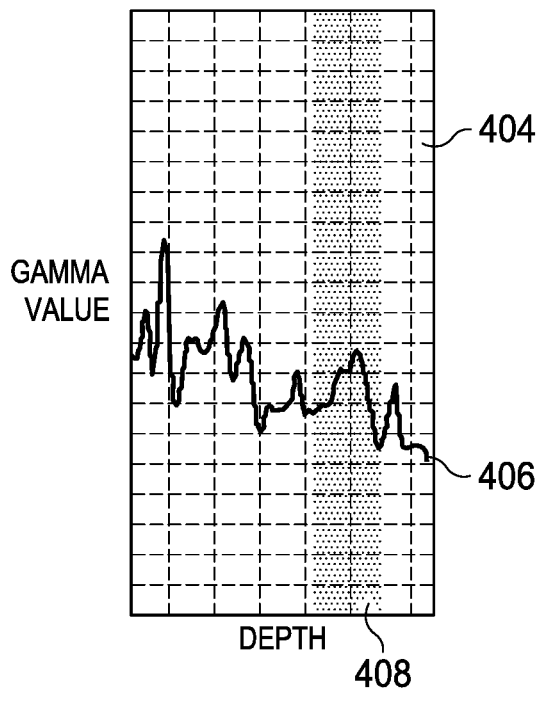
FIG. 4 illustrates one embodiment of a log file that may be used by the method of FIG. 3.

With additional reference to FIG. 4, one embodiment of a portion of a gamma log 402 is illustrated. The gamma log 402 includes a graph 404 that visually illustrates a series of gamma readings using line 406 to represent gamma radiation values and corresponding depths. In the present example, a portion 408 of the gamma log 402 has been highlighted for use as a baseline marker, as will be described with respect to the next step of FIG. 3.

Figure 5:
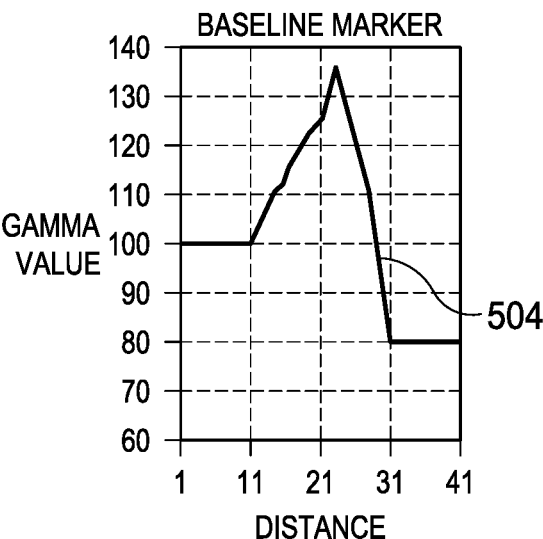
FIG. 5 illustrates one embodiment of a baseline marker that may be created from the log file of FIG. 4.

Referring again to FIG. 3, in step 304, a baseline marker is created from the selected portion of the gamma log. For example, referring to FIG. 5, one embodiment of a chart 502 provides a representation of a baseline marker 504. The baseline marker 504 is shown against an axis representing the gamma value and an axis representing the distance (e.g., width) of the baseline marker 504. It is understood that this information is derived from the gamma log 402 of FIG. 4, with the width being calculated based on the depth at which the particular points of the baseline marker 504 appear on the gamma log 402. It is further understood that the baseline marker 504 may be an exact match of the waveform from the gamma log 402 or may be a waveform representation (e.g., may be based on the waveform but not an exact representation).

Figure 6:
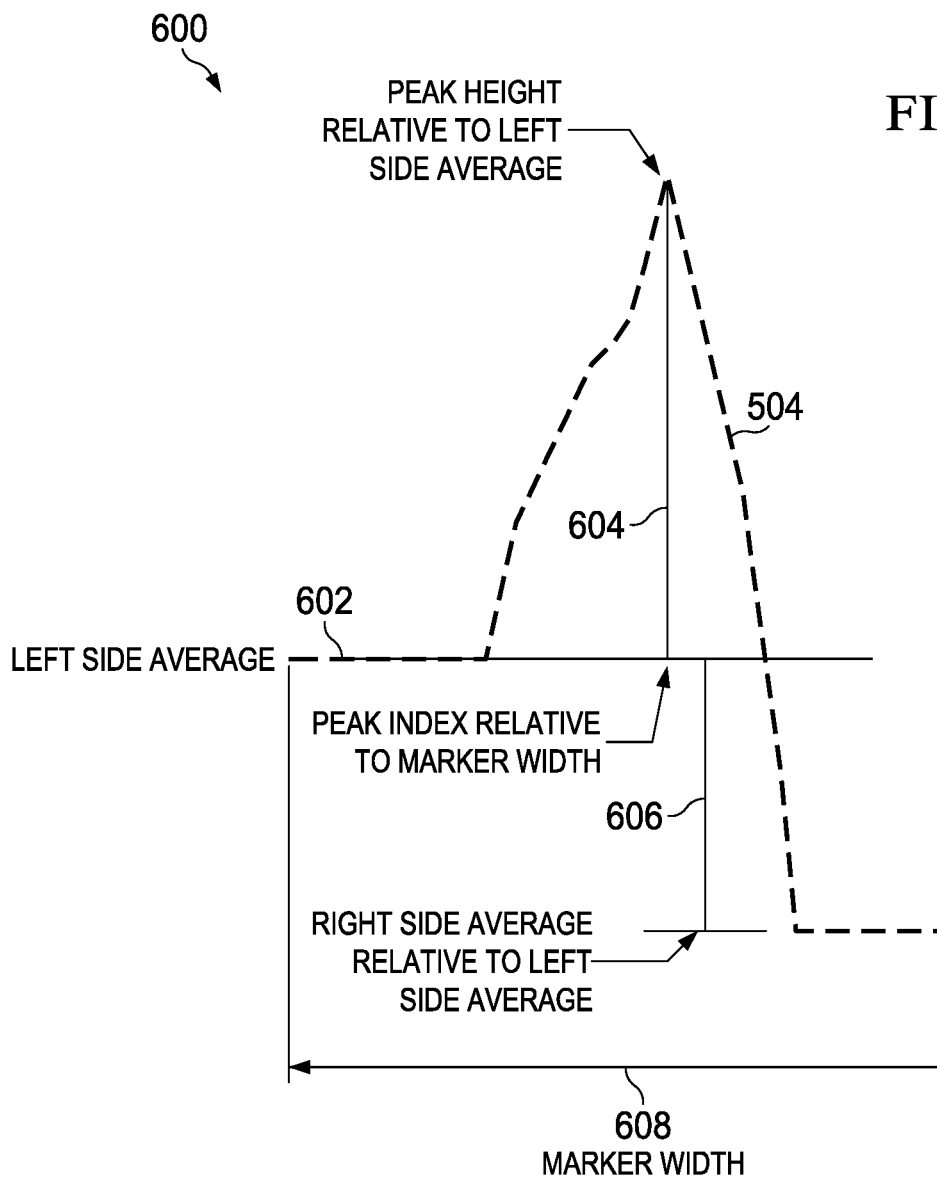
FIG. 6 illustrates one embodiment of a representation of the baseline marker of FIG. 5.
Figure 7:
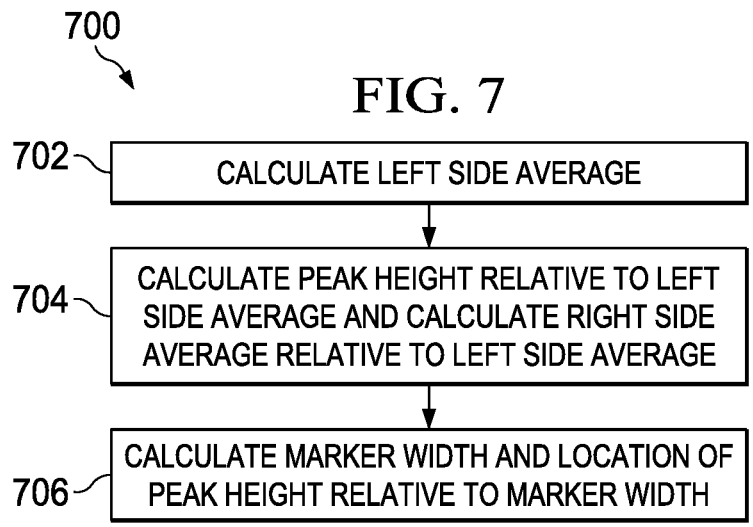
FIG. 7 illustrates a flow chart of one embodiment of a method that may be used to create the representation of FIG. 6.

With additional reference to FIGS. 6 and 7, embodiments of a diagram 600 (FIG. 6) and method 700 (FIG. 7) illustrate a waveform representation of a baseline marker (e.g., the baseline marker 504 of FIG. 5) and how such a waveform representation may be constructed. It is understood that the waveform representation is one example of a mathematical representation (e.g., a fingerprint) of the baseline marker 504. It is further understood that this is only one example of how fingerprinting may occur for a baseline marker and that many other representations may be used. In addition, while described with respect to the method 300 of FIG. 3, it is understood that the representation may be constructed as part of one or more other processes, such as during the creation of fingerprints for new wells as will be described later.

As illustrated in FIG. 6, in the present example, the waveform representation includes a line 602 that represents the left side average of the baseline marker 504. A line 604 represents the peak height relative to the left side average. A line 606 represents the right side average relative to the left side average. A line 608 represents the width of the baseline marker. The width may vary based on the portion of the gamma log selected as the baseline marker 504. The position of the line 604 with respect to the line 608 represents the location of the peak index relative to the width of the baseline marker. It is understood that this waveform representation is primarily constructed using relative values to meet the challenge of identifying a planned marker even when changes have occurred in amplitude, width, shape, and/or other characteristics.

In general, measured amplitudes may be handled carefully due to differences in sensors. For example, a comparison between the recorded amplitude of a baseline marker and the recorded amplitude of a planned marker cannot be relied upon when the gamma radiation sensors are not calibrated relative to one another. Accordingly, while amplitude may be used in the selection of baseline markers and the later comparison of baseline markers and planned markers, the present disclosure generally uses relative amplitude (e.g., relative to the left side average) rather than absolute amplitude. In embodiments where the sensors are known to be calibrated relative to one another and/or where the recorded sensor results can be adjusted to account for sensor differences, absolute amplitude may be relied upon more heavily.

It is understood that a waveform representation may have many different characteristics. For example, a multi-peak waveform representation may be used (with or without averaging the peaks). This may be particularly useful in build and lateral sections of the borehole where the waveform is rotated rather than being vertical. This may also be useful when the log file can be read in two directions (e.g., forward and backward) as having at least two peaks to read may provide insight into which direction the log file is being read since the order in which the peaks are identified will be different depending on the direction in which the log file is read.

While the present disclosure is described using vertical sections of the borehole 106, it is understood that the concepts described herein may also be applied to horizontal and build sections. Although some differences may exist between vertical, horizontal, and build sections, the basic process of using baseline markers and planned markers to assess the accuracy of drilling in real time or near real time and to make corrections if needed remains the same.

As illustrated in FIG. 7, the method 700 may be used to construct the waveform representation of FIG. 6. In step 702, the left side average is calculated. It is understood that the left side average may be used because the gamma log generally follows a pattern of descending depth. This means that the left part of the log (e.g., the "top" of the log representing shallower depths) will be scanned first during real time or near real time scanning. Accordingly, the first part of a baseline marker to be scanned will typically be the left side of the baseline marker. It is understood that this process may be performed differently (e.g., scanning from right to left) and would still be covered by the current description, but scanning from left to right (e.g., shallower depths to deeper depths) is the general process used for this example.

The left side average may be calculated in many ways. For example, the left side average may be a single average value from the left side of the marker to the peak. In other embodiments, there may be multiple averages. For example, a stair step or multi-peak average may be used. The right side average may be calculated in the same way as the left side average or in a different way. Furthermore, the averaging process may vary depending on the particular shape and/or width of the portion of the waveform being averaged.

In step 704, the peak height and the right side average are calculated relative to the left side average. For example, continuing the example of FIG. 5, the left side average may be a gamma reading of 100. The peak height is 135 and the right side value is 80. The peak height relative to the left side average would be 1.35. The right side average relative to the left side would be 0.80.

In step 706, the width of the baseline marker is calculated and the location of the peak height relative to the width is calculated. The width may be calculated by subtracting the TVD of the right side from the TVD of the left side. The location of the peak height may then be identified. For example, if the width is forty-one feet, the location of the peak can be calculated as whatever value matches the location of the peak height. It is noted that the use of relative values and averages enables a possible match between two waveforms to be described in terms of a percentage, as an exact match is unlikely to occur. For example, the use of relative values addresses discrepancies that might otherwise exist between two waveforms due to sensors not being calibrated with respect to one another, as well as formation to formation discrepancies. A more detailed example of this process is discussed later.

Referring again to FIG. 3, in step 306, the baseline marker and corresponding information (e.g., name and waveform representation (as the actual waveform and/or as calculated representation values) are stored in the baseline marker archive corresponding to the well with which the gamma log is associated. In step 306, a determination may be made as to whether the method 300 has finished (e.g., whether additional baseline markers are to be selected from the gamma log). If the determination indicates that the method 300 is not finished, the method returns to step 302. If the determination indicates that the method 300 is finished, the method ends.

Figure 8:
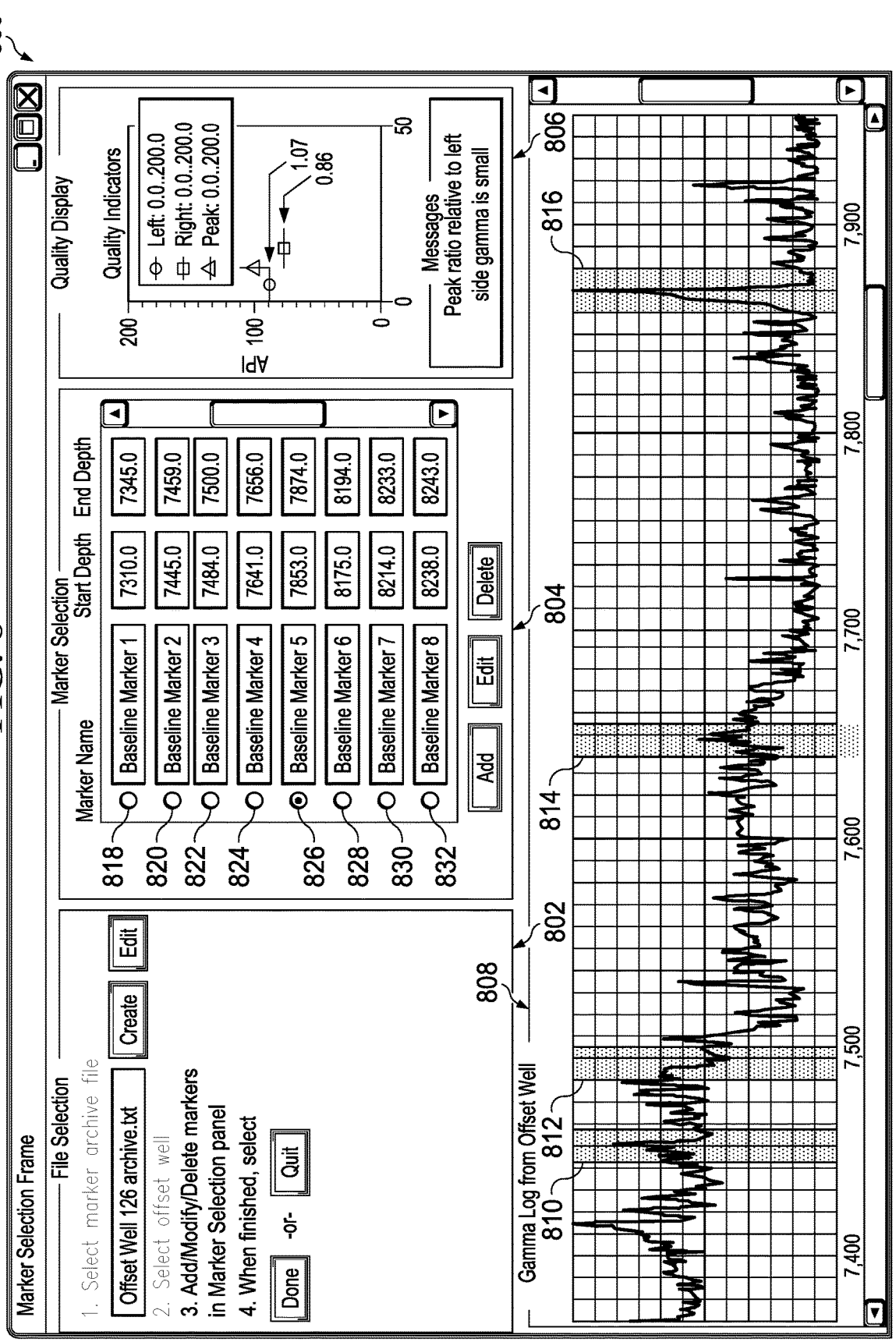
FIG. 8 illustrates one embodiment of a graphical user interface that may be used to interact with the method of FIG. 4.

Referring to FIG. 8, one embodiment of a GUI 800 illustrates an interface that may be used to retrieve a log file and add, edit, or delete baseline markers. It is understood that the GUI 800 is for purposes of example and that many different GUIs may be used to provide some or all of the functionality shown with the GUI 800. In the present example, the GUI 800 includes a file selection panel 802, a marker selection panel 804, a quality display panel 806, and a gamma log panel 808.

In operation, a user may create or edit a marker archive file using section 802. In the present example, the marker archive file is "Offset Well 126 archive.txt," which corresponds to the offset well 126 of FIG. 1A. A corresponding offset well may be associated with the offset well if that has not already been done. The user may then highlight (e.g., using a mouse, keyboard, and/or other interfaces) one or more sections of the gamma log. As these are highlighted, they are added to the marker selection panel 804. For example, the illustrated portion of the gamma log includes four selected portions 810, 812, 814, and 816. The marker selection panel 804 illustrates eight markers 818, 820, 822, 824, 826, 828, 830, and 832, each of which has a name, a start depth, and an end depth. The start depth and end depth may be automatically entered based on the corresponding selected portion. For purposes of illustration, the selected portion 810 corresponds to marker 820, the selected portion 812 corresponds to marker 822, the selected portion 814 corresponds to marker 824, and the selected portion 816 corresponds to marker 826.

The quality display panel 806 contains quality indicators that illustrate a quality level of the currently selected marker. The quality level represents the strength of the selected marker. For example, the quality display panel 806 may include a graph that illustrates a qualitative analysis of the difference between the right side average and the left side average, as well as the difference between the left side average and the peak. The selected widths are also illustrated. Using this feedback, a user can select the marker differently to strengthen these attributes.

In the present example, the quality display panel 806 plots left, right, and peak values against a vertical axis measured in API (the unit of radioactivity used for gamma logs) and a horizontal axis measured in width. The width may be represented as TVD in some embodiments. It is noted that in offset logs, the TVD generally equals the measured depth unless the log is a TVD converted log. A messages section may be used to comment on the quality of the currently selected marker. For example, the current message indicates that the peak value is small relative to the left side value.

Accordingly, using the GUI 800, a user can scroll through a gamma log, select portions of the gamma log, and save those portions as baseline markers. In addition, previously saved baseline markers can be edited or deleted.

Figure 9:
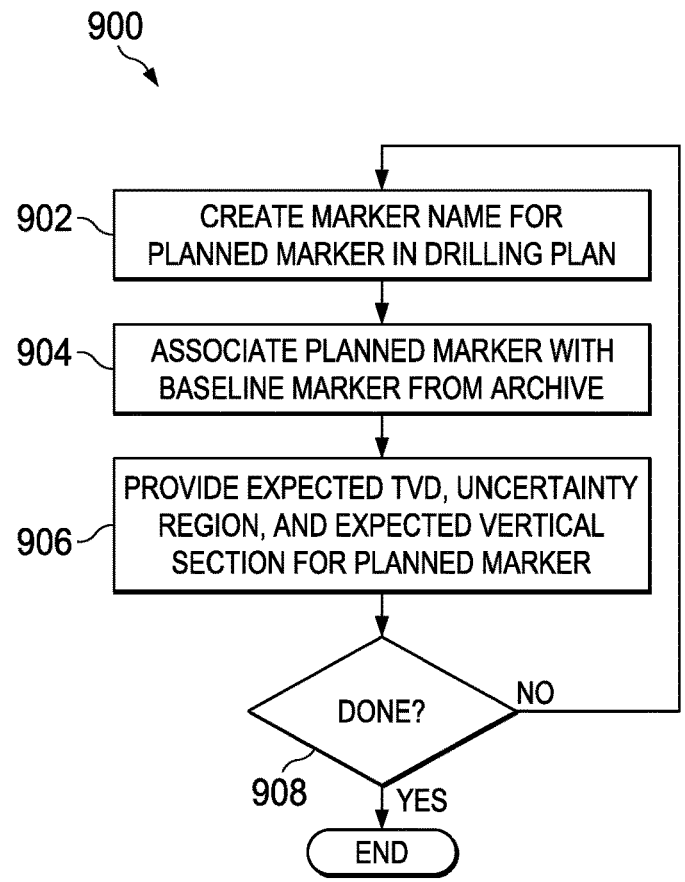
FIG. 9 illustrates a flow chart of one embodiment of a method that may be used to create planned markers and associate them with baseline markers.

Referring to FIG. 9, one embodiment of a method 900 illustrates a process that may be used to create planned markers for a drilling plan for a new well and associate each planned marker with a corresponding baseline marker from an existing well. For example, using the environment 100 of FIG. 1A, a drilling plan is being created or revised for the borehole 106. Baseline markers have been created for the offset well 126 and those baseline markers are available for use in the planning of the borehole 106. While there may be variations between the baseline markers and the planned markers once the planned markers are actually located in the borehole 106 (e.g., differences in TVD, gamma levels, and/or shape) due to differences between the two locations within the formation 102, the baseline markers provide at least some knowledge of where the planned markers may appear.

In step 902, a marker name is created for a new planned marker. In step 904, the planned marker is associated with a baseline marker from the marker archive of the offset well 126. For example, assume that a planned marker will likely occur at the layer boundary 113. This planned marker may then be associated with a baseline marker from the offset well 126 that is located at the layer boundary 113.

In step 906, an estimated depth, an uncertainty region, and an expected vertical section may be provided for the planned marker (e.g., entered or imported from a database or other memory). The estimated depth may be based on other information, such as general knowledge of the formation 102 (e.g., whether the boundary layer 113 is level, rising, or falling between the offset well and the planned borehole 106). It is understood that such information may be gathered from other offset wells, other wells, and/or other types of survey information, and may be gathered both locally and over a relatively large region. For example, databases that may contain such information are described previously incorporated U.S. Pat. No. 8,210,283 entitled SYSTEM AND METHOD FOR SURFACE STEERABLE DRILLING.

The uncertainty region provides an estimated region in which the planned marker may be found (e.g., plus or minus twenty feet). The expected vertical section provides a reference to the drilling plan and more specifically identifies a particular vertical section of the plan in which the planned marker is likely to be located. It is understood that more or less information may be provided. For example, the expected vertical section may be omitted in some embodiments.

Further adjustments may be made if needed. For example, if the waveform representation is calculated based on the appearance of a waveform in a vertical section, but it is estimated that the marker will be identified in a build section in the current borehole, then the waveform representation must likely be modified or it will be missed. Accordingly, compensations may be made based on factors such as where a particular waveform representation is expected to be located in the current borehole.

In step 908, a determination may be made as to whether the process has finished (e.g., whether there are more planned markers to create). If the process is not finished, the method 900 returns to step 902. If the process is finished, the method 900 ends.

Figure 10:
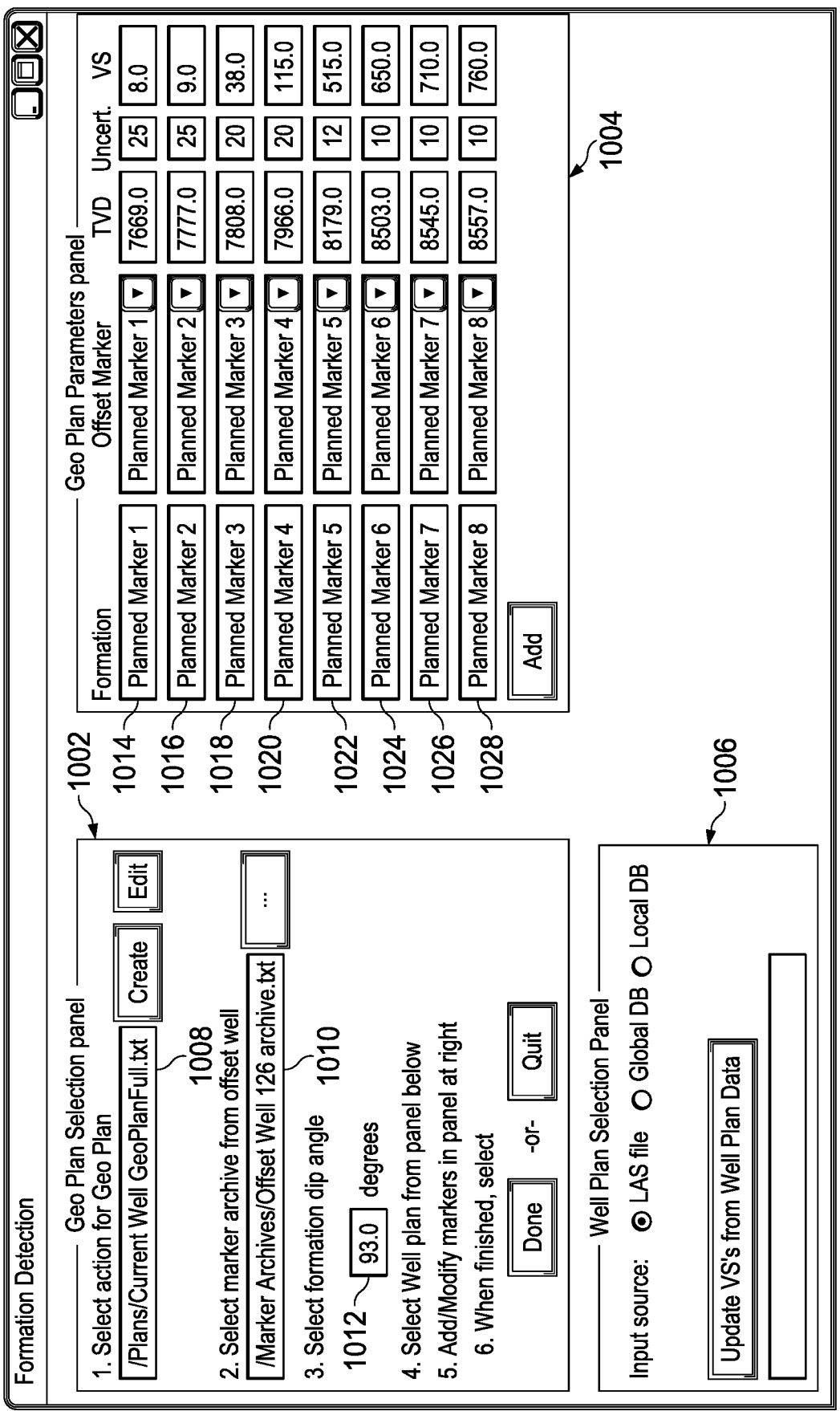
FIG. 10 illustrates one embodiment of a graphical user interface that may be used to interact with the method of FIG. 9.

Referring to FIG. 10, one embodiment of a GUI 1000 illustrates an interface that may be used to create and/or edit planned markers for a drilling plan. It is understood that the GUI 1000 is for purposes of example and that many different GUIs may be used to provide some or all of the functionality shown with the GUI 1000. In the present example, the GUI 1000 includes a geo plan selection panel 1002, a geo plan parameters panel 1004, and a well plan selection panel 1006.

In operation, a user may create or edit a geo plan for the borehole 106 via text box 1008 and associated control buttons. In the present example, the geo plan is named "Current Well Geo Plan Full.txt." The user may also select a marker archive as illustrated by text box 1010. In the present example, the marker archive is the "Offset Well 126 archive.txt" described with respect to FIG. 8. A formation dip angle may be entered in text box 1012. In some embodiments, a dip angle may be suggested for the user based on identified trends, current/next markers, and/or similar factors. A well plan may be selected from the well plan selection panel 1006 from any of multiple sources, such as a Log ASCII Standard (LAS) file, a global database, or a local database. It is understood that the geo plan, marker archive, and/or well plan may be pulled from storage, either local or online (e.g., from a remotely accessible database or a server cloud).

For purpose of example, the geo plan parameters panel 1004 illustrates eight planned markers 1014, 1016, 1018, 1020, 1022, 1024, 1026, and 1028. Each planned marker corresponds to one of the baseline markers 818, 820, 822, 824, 826, 828, 830, and 832 of FIG. 8, with planned marker 1014 corresponding to baseline marker 818, planned marker 1016 corresponding to baseline marker 820, planned marker 1018 corresponding to baseline marker 822, planned marker 1020 corresponding to baseline marker 824, planned marker 1022 corresponding to baseline marker 826, planned marker 1024 corresponding to baseline marker 828, planned marker 1026 corresponding to baseline marker 830, and planned marker 1028 corresponding to baseline marker 832.

Each planned marker 1014, 1016, 1018, 1020, 1022, 1024, 1026, and 1028 is also associated with an estimated TVD, an uncertainty range, and an estimated vertical section. For example, the planned marker 1022 has been assigned an estimated TVD of 8179 feet with an uncertainty range of plus or minus twelve feet. It is expected to appear in vertical section five hundred and fifteen of the drilling plan. Accordingly, using the corresponding baseline marker 826 of FIG. 8 taken from the portion 816, a gamma log of the borehole 106 may be scanned to find the planned marker 1022. It is noted that the estimated vertical section is not needed if the log is converted to Kelly bushing TVD (KBTVD) references.

The estimated TVD, uncertainty range, and/or the estimated vertical section may provide benchmarks for determining the accuracy of the well plan and/or may be used to focus more detailed scanning on a particular section. For example, rather than scan each foot (or whatever resolution is selected) for a fingerprint, the system may skip or more rapidly scan portions of the gamma log that are unlikely to contain planned markers and focus on portions of the gamma log more likely to contain such markers.

Figure 11:
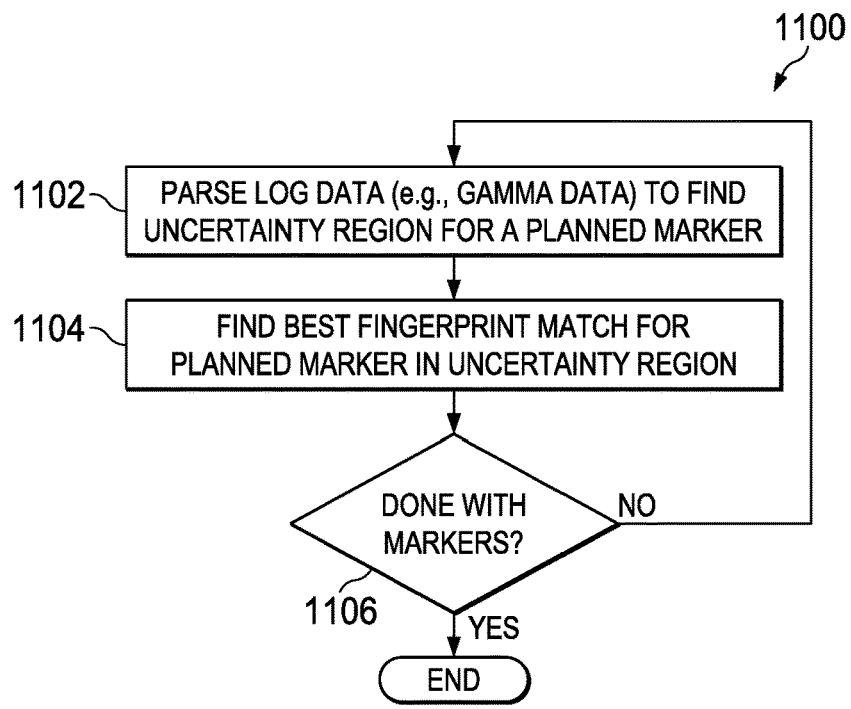
FIG. 11 illustrates a flow chart of one embodiment of a method that may be used to parse log data and identify planned markers.

Referring to FIG. 11, one embodiment of a method 1100 illustrates a process that may be used to scan a log for planned markers. In the present example, the log is a gamma log from the borehole 106 of FIG. 1A, but it is understood that other types of logs may be used.

In step 1102, log data collected as the borehole 106 is drilled is parsed. The parsing may be performed in many different ways, including scanning the log file at each foot or using another defined resolution increment, scanning for an uncertainty section, scanning for a vertical section, and/or scanning using other parameters. For example, scanning for the planned marker 1022 (FIG. 10) may involve rapidly scanning to 8167 feet (i.e., the planned TVD of 8179 minus the uncertainty range of twelve feet) and then examining the log file more closely for the planned marker. In step 1104, the best fingerprint match for the planned marker is identified for the uncertainty region. For example, there may be multiple matches or at least multiple possible matches, and the method 1100 may select the best match.

In step 1106, a determination may be made as to whether the process has finished (e.g., whether more markers remain to be found). If the process is not finished, the method 1100 returns to step 1102. If the process is finished, the method 1100 ends.

Figure 12A:
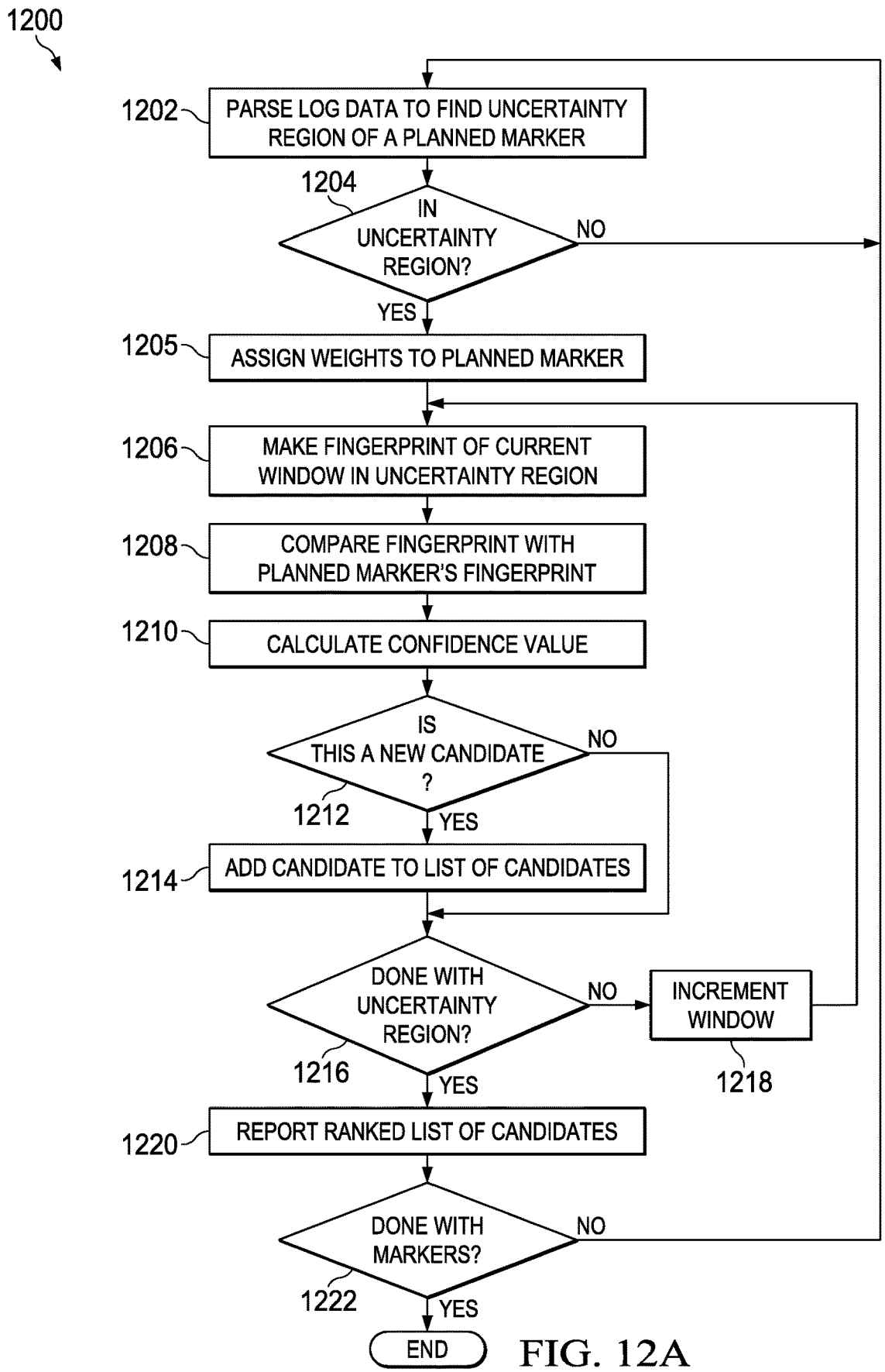
FIG. 12A illustrates a flow chart of one embodiment of a more detailed example of the flow chart of FIG. 11.

Referring to FIG. 12A, one embodiment of a method 1200 illustrates a more detailed example of the method 1100 of FIG. 11. In step 1202, log data is parsed to identify an uncertainty region. In step 1204, a determination may be made as to whether an uncertainty region has been found. If no uncertainty region has been found, the method 1200 returns to step 1202. If an uncertainty region has been found, the method 1200 continues to step 1205. In step 1205, weights are assigned to the planned marker.

In step 1206, a fingerprint is made of the current window of the uncertainty region. For example, if the planned marker is twenty feet wide, the current window may be a twenty foot window. The system would make a fingerprint of this window (as described previously).

In step 1208, the fingerprint of the current window is compared to the planned marker's fingerprint. In step 1210, a confidence value is calculated based on the comparison of step 1208. In step 1212, a determination is made as to whether the current fingerprint is a new candidate based on the TVD location of the peak. If the current fingerprint is a new candidate, the method 1200 adds the candidate to a list of candidates in step 1214 before moving to step 1216. If the current fingerprint is not a new candidate, the method 1200 continues to step 1216 without adding to the candidate list.

In step 1216, a determination may be made as to whether the method 1200 is done with the current uncertainty region. If the method 1200 is not done with the uncertainty region, the method 1200 increments the window in step 1218 and returns to step 1206. For example, if the window has a one foot resolution, the window's position will be incremented by one foot (e.g., the window will move forward one foot). If the method 1200 is done with the uncertainty region, the method 1200 moves to step 1220, where the list of candidates may be reported. This enables a user to review and select a best match from all possible candidates. In some embodiments, the list may be ranked based on the level of confidence and/or other criteria.

In step 1222, a determination may be made as to whether the process has finished (e.g., whether more of the log is to be scanned). If the process is not finished, the method 1200 returns to step 1202. If the process is finished, the method 1200 ends.

Figure 12B:
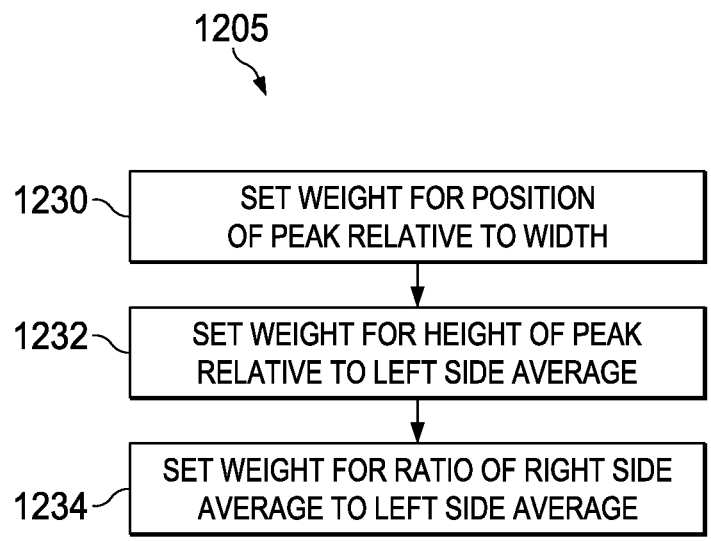
FIG. 12B illustrates a flow chart of one embodiment of a more detailed example of one step of the flow chart of FIG. 12A.

Referring to FIG. 12B, a more detailed embodiment of step 1205 of FIG. 12A is illustrated. As described previously, the best match between a reference marker and the current window in the active gamma log is needed. To accomplish this, a fingerprint matching process is used to turn gamma samples into fingerprints to improve the matching success rate. This is expressed as a multistep approach in FIG. 12B as follows.

The fingerprint matching process compares attributes between two fingerprints (e.g., a reference fingerprint and a candidate fingerprint) and produces a score based on the comparison. The fingerprint matching process considers three primary attributes in the comparison of fingerprints and provides their relative weights in the final score as follows:

PIW: 0.5
PRD: 0.2
RRD: 0.3 where PIW=peak index weight, PRD=peak relative distance, and RRD=right relative distance. It is understood that other values may be used for relative weighting and the provided values are only for purposes of example. Prior to scanning an uncertainty region, the fingerprint matching process saves the relative weights of the reference fingerprint.

In step 1230, the weight is set for the position of the peak relative to the width. For example, if a fingerprint has a width of ten (10) and the peak is in index five (5), then the highest match will occur if a sample has its peak at index five. Each index location further from the peak index will have a lower factor (e.g., indexes 4, 3, 2, and 1 would have successively lower factor values). This is expressed as follows:

$$lc=\max(rc, ltc) \quad \text{(Equation 1)}$$

$$pif_{ref}=100.0-(lc+1) \quad \text{(Equation 2)}$$

where lc=largest count, rc=right count, ltc=left count, and $pif_{ref}$=peak index factor of the reference fingerprint.

In step 1232, the weight is set for the height of the peak relative to the left side average. For example, if the left average is 80 API and the peak is 120 API, then the peak relative distance is 0.5. This is expressed as $$prd_{ref}=(pd/la)-1.0 \quad \text{(Equation 3)}$$

where $prd_{ref}$=peak relative distance of the reference fingerprint, pd=peak distance of the relative fingerprint, and la=left side average of the relative fingerprint.

In step 1234, the weight is set for the ratio of the right side average relative to the left side. For example, if the left average is 80 API and the right average is 60 API, then the right relative distance is −0.25. This is expressed as $$rrd_{ref}=(ra/la)-1.0 \quad \text{(Equation 4)}$$

where ra=right side average of the reference fingerprint and $rrd_{ref}$=right side relative distance to the left side average of the reference fingerprint.

Figure 12C:
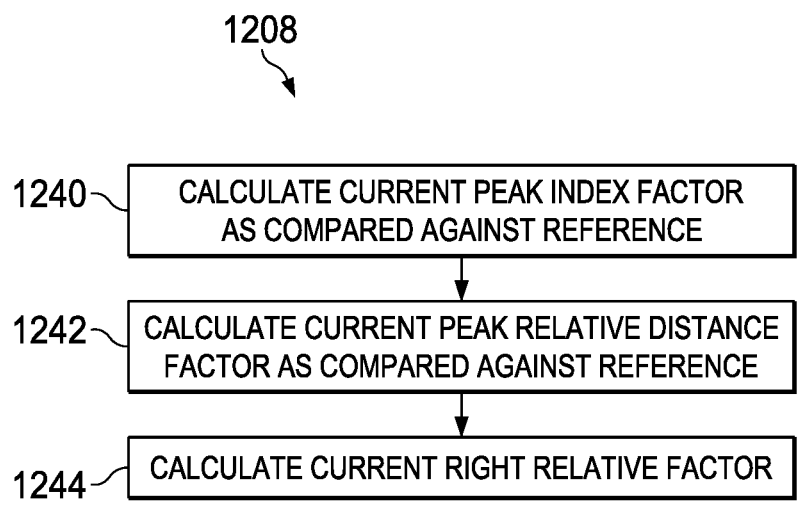
FIG. 12C illustrates a flow chart of one embodiment of a more detailed example of one step of the flow chart of FIG. 12A.

Referring to FIG. 12C, a more detailed embodiment of step 1208 of FIG. 12A is illustrated. When a candidate fingerprint (also referred to herein as a "current" fingerprint) is created from the current window of gamma data in the uncertainty region, a score is computed when the candidate fingerprint is compared against the reference fingerprint. To compute the score, the fingerprint matching process must first determine the match value of each attribute of the candidate fingerprint. This is expressed as a multistep approach in FIG. 12C as follows.

In step 1240, the current peak index factor ($pif_m$) as compared against the reference ($pif_{ref}$) is calculated, which is expressed as $$pif_{cur}=100.0-abs(pcl_{cur}-pcl_{ref})*mif_{ref} \quad \text{(Equation 5)}$$

where $pif_{cur}$=peak index factor of the current fingerprint and $pcl_{cur}$=peak count location of the current fingerprint.

In step 1242, the current peak relative distance factor as compared against the reference ($prd_{ref}$) is calculated, which is expressed as $$prf_{cur}=\min(100.0,(prd_{cur}-1.0)/prd_{ref})*100.0) \quad \text{(Equation 6)}$$

where $prf_{cur}$=peak relative factor of the current fingerprint and $prd_{cur}$=peak relative distance to the left side average of the current fingerprint.

In step 1244, the current right relative factor is calculated, which is expressed as $$rrf_{cur}=((rrd_{cur}-1.0)/rrd_{ref})*100.0 \quad \text{(Equation 7)}$$

where $rrf_{cur}$=right relative factor of the current fingerprint and $rrd_{cur}$=right relative distance to the left side average of the current fingerprint.

Referring again to FIG. 12A, in step 1210, the overall score can now be calculated as:

$$score=(PIW*pif_{cur})+(PRD*prf_{cur})+(RRD*rrf_{cur}) \quad \text{(Equation 8)}$$

As described previously, the fingerprint matching process calculates a score for each increment of an uncertainty region. When the process completes the uncertainty region, the scores are ranked and a list of candidates is provided to a user. The ranking may use any criteria, but the scores are ranked with the highest score listed first for purposes of example.

Figure 13A:
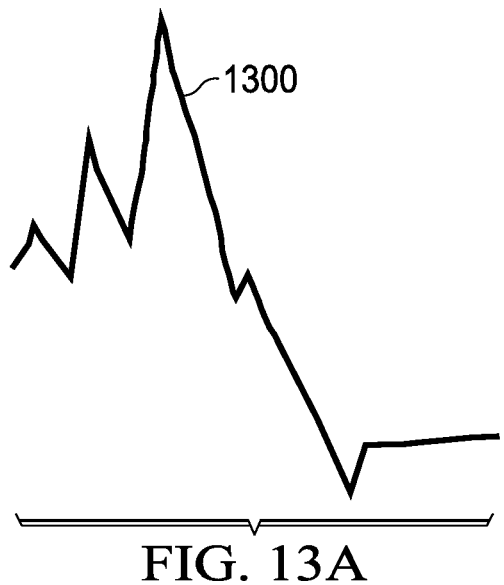
FIGS. 13A-13D illustrate diagrams of embodiments of a reference fingerprint and candidate fingerprints that may be obtained from an uncertainty region and compared against the reference fingerprint.
Figure 13B:
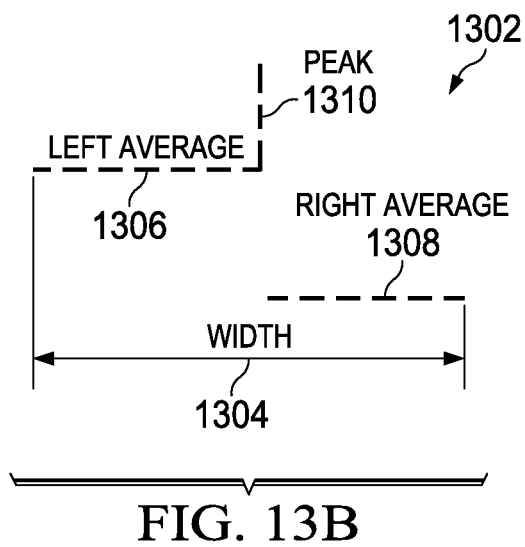
Figure 13C:
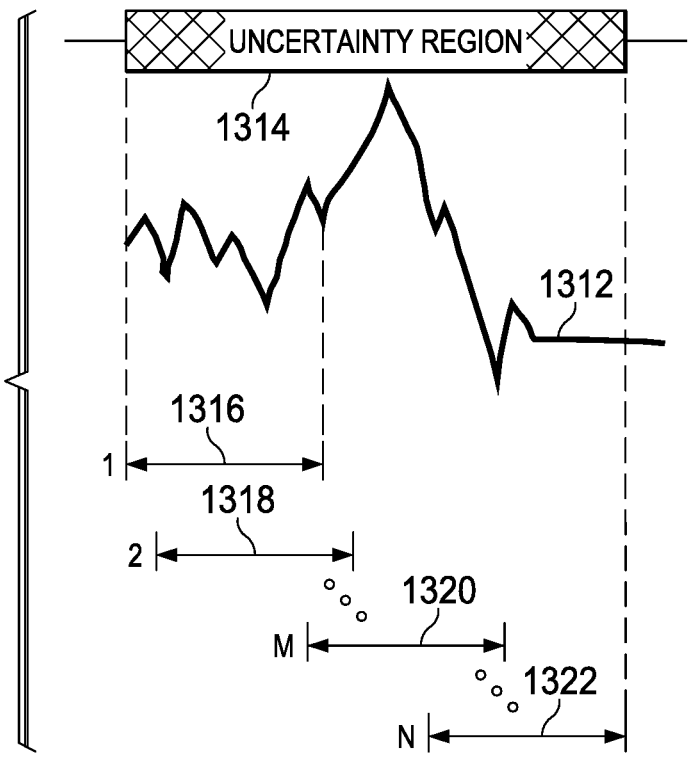

Referring to FIGS. 13A-13C, an embodiment of a process for searching for a reference fingerprint in an uncertainty region is illustrated visually. It is understood that FIGS. 13A-13C are not necessarily drawn to scale, but are provided to visually illustrate the overall process of comparing candidate fingerprints against reference fingerprints.

A reference waveform representation 1300 (FIG. 13A) is broken down into basic elements that form a reference fingerprint 1302 (FIG. 13B). As described with respect to FIG. 6, the reference fingerprint 1302 may be broken down into particular parts, such as a width 1304, a left side average 1306, a right side average 1308, and a peak 1310 that has height and index attributes. These parts and corresponding calculations have been described in detail above and are not described in the present example.

As illustrated in FIG. 13B, from a visual perspective, the left side average 1306 is relatively high compared to the right side average 1308. The peak index is approximately at the midpoint of the width 1304. These components describe the reference fingerprint 1302 for which an uncertainty region will be scanned.

As illustrated in FIG. 13C, a waveform 1312 (e.g., from a gamma log) falls within an uncertainty region 1314. The width of the uncertainty region 1314 is greater than the width of the reference fingerprint 1302 and so multiple search windows will be scanned to try to identify the reference fingerprint 1302. In the present example, the search windows begin with a search window 1316 at depth "1", include a search window 1318 at depth "2" and a search window 1320 at depth "m", and end with a search window 1322 at depth "n". Other search windows may be included based on the size of the uncertainty region and the width of the reference fingerprint 1302. It is understood that the depth may be the actual depth (e.g., 7232 feet) or may be an index based on the uncertainty region 1314 (e.g., the first search window in the uncertainty region) or another baseline.

Figure 13D:
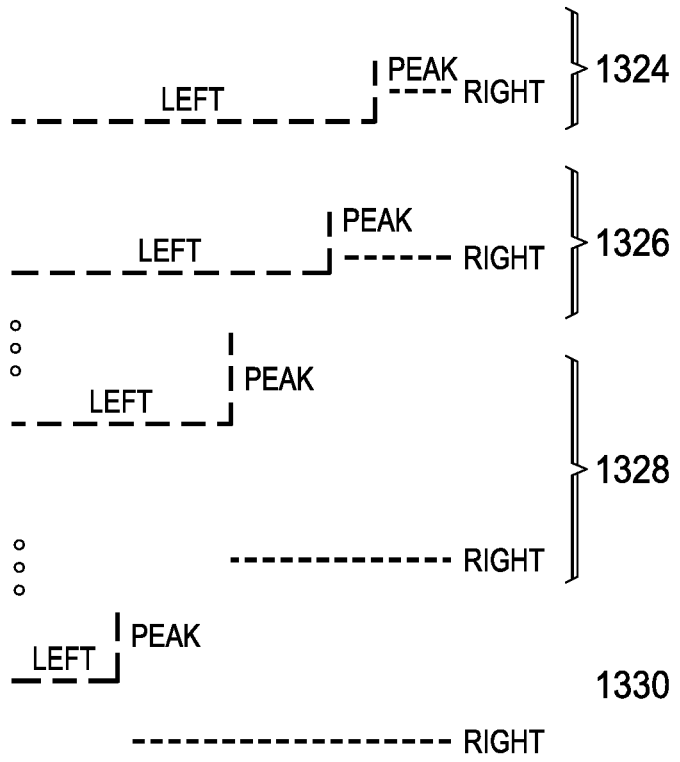

As illustrated in FIG. 13D, the search window 1316 corresponds to a candidate fingerprint 1324, the search window 1318 corresponds to a candidate fingerprint 1326, the search window 1320 corresponds to a candidate fingerprint 1328, and the search window 1322 corresponds to a candidate fingerprint 1330.

From a visual perspective, the candidate fingerprint 1324 has a left side average that is relatively long compared to the right side average. Furthermore, the right side average is higher than the left side average. The peak is relatively low and the peak index is shifted towards the right side. When compared to the reference fingerprint 1302, the differences are significant. For purposes of example, the candidate fingerprint 1324 is assigned a score of ten out of one hundred.

The candidate fingerprint 1326 has a left side average that is relatively long compared to the right side average, but shorter than that of the candidate fingerprint 1324. The right side average is higher than the left side average. The peak is relatively low and peak index is shifted towards the right side, but less than the shift in the candidate fingerprint 1324. When compared to the reference fingerprint 1302, the differences are significant. For purposes of example, the candidate fingerprint 1326 is assigned a score of fifteen.

The candidate fingerprint 1328 has a left side average that is relatively equal in length to the right side average. The right side average is significantly lower than the left side average. The peak is higher than the peaks of the candidate fingerprints 1324 and 1326 and is relatively centered. When compared to the reference fingerprint 1302, the similarities are significant. For purposes of example, the candidate fingerprint 1328 is assigned a score of ninety-five.

The candidate fingerprint 1330 has a left side average that is short compared to the right side average. The right side average is significantly lower than the left side average. The peak is lower than the peak of the candidate fingerprint 1328 and similar to the peaks of the candidate fingerprints 1324 and 1326. The peak index is relatively far to the left. When compared to the reference fingerprint 1302, the similarities are significant, although less significant than those of the candidate fingerprint 1328. For purposes of example, the candidate fingerprint 1330 is assigned a score of eighty.

For purposes of example, all other scores for candidate fingerprints within the uncertainty region 1314 are less than eighty and greater than fifteen. The scores may be sent as a ranked candidate list as shown in Table 1 below with a higher score indicating a better match.

TABLE 1

Candidate list

| Depth | Score |
|---|---|
| m | 95 |
| n | 80 |
| 2 | 15 |
| 1 | 10 |

Figure 14:
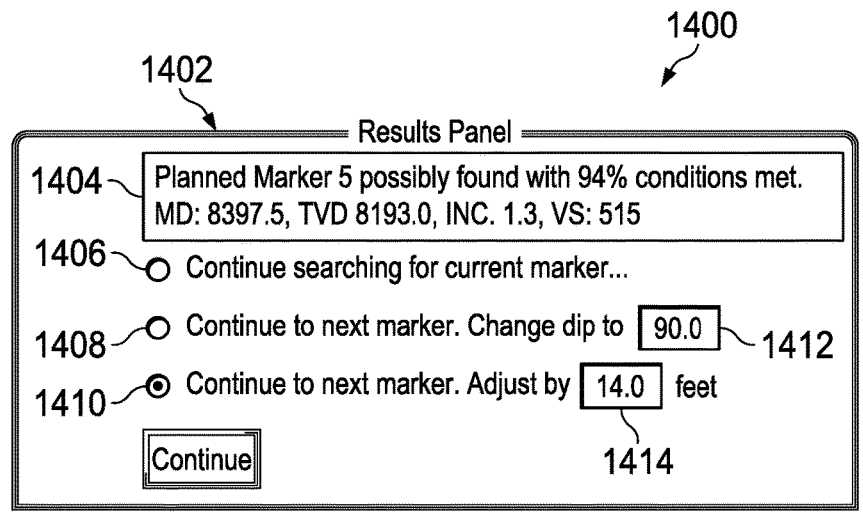
FIG. 14 illustrates one embodiment of a graphical user interface that may report information from the method of FIG. 11 and/or the method of FIG. 12 and allow a modification to be made.

Referring to FIG. 14, one embodiment of a GUI 1400 illustrates an interface that may be used to provide reporting information on a possible match and to present options for modifying the drilling plan. It is understood that the GUI 1400 is for purposes of example and that many different GUIs may be used to provide some or all of the functionality shown with the GUI 1400. In the present example, the GUI 1400 includes a results panel 1402 that may stand alone or may be part of another GUI.

In the present example, a potential match for Planned Marker 5 (e.g., marker 1022 of FIG. 10) has been identified with ninety-four percent of the conditions for a match being met. Information from the log may be provided, including measured depth (MD), TVD, inclination (INC), and vertical section. Continuing the example of FIG. 5, the planned marker 1022 had an estimated depth of 8179 feet and estimated vertical section 515. As reported from the log, the possible match has a TVD of 8193 feet. Accordingly, while at the correct TVD, the possible match is fourteen feet lower than the plan.

The results panel 1402 may present a user with various options, including options 1406, 1408, and 1410. Option 1406 is to continue searching for the next marker without any changes. Option 1408 is to continue to the next marker, but with a change in dip as defined in text box 1412. Option 1410 is to continue to the next marker, but with an adjustment to the next planned marker's estimated TVD as defined in text box 1414. In the current example, option 1410 has been selected and the estimated TVD for the next marker (e.g., planned marker 6) will be adjusted downward by fourteen feet. It is understood that the adjustments of options 1408 and 1410 may affect the remainder of the drilling plan or may be limited (e.g., may only affect a defined number of markers).

Figure 15:
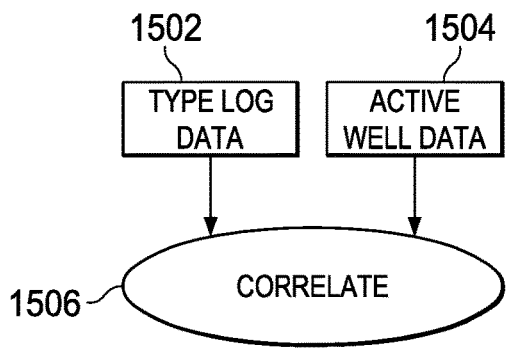
FIG. 15 illustrates correlation between type log data and actively drilling well data.

Dynamic formation detection may also be accomplished using a method that dynamically correlates formation patterns between a previously stored type log (gamma log, ROP log, AES log, etc.) and an actively drilling well. This dynamic formation detection as illustrated in FIG. 15 utilizes the type log data 1502 with the active well data 1504 which may be correlated at 1506 as will be more fully described herein below using dynamic depth warping. This correlation process is carried out dynamically during the drilling of the well rather than at a post processing time. The correlation process 1506 makes real time use of a dynamic depth warping algorithm in order to achieve the formation detection. Dynamic gain adjustment is made between the type log data 1502 and the active well data 1504. The type log data 1502 may comprise gamma data, MSE data, resistivity data and/or ROP data that is correlated with similar data from the active well data 1504. The dynamic depth warping algorithm makes adjustments to the data based upon marker approvals.

Figure 16:
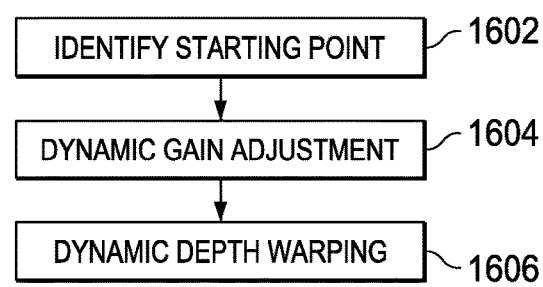
FIG. 16 is a flow diagram generally illustrating the dynamic depth warping process.

Referring now to FIG. 16, there is generally illustrated the dynamic depth warping process. Initially, a starting point for correlation above the geological formation top is identified at step 1602 to act as a starting point for processing by the dynamic depth warping algorithm. In order to focus the dynamic depth warping algorithm to the curves from the well data and the type log data, the start point must be initially established. When geo-plans are created, the plan identifies the formations expected to be encountered while drilling and identify the point at which correlation between the sources becomes meaningful. Thus, the dynamic depth warping algorithm will identify a formation top as a point to start correlation between the type log data 1502 and active well data 1504. In order for the dynamic depth warping algorithm to have enough data to make a good correlation between the type log data 1502 and active well data 1504, the dynamic depth warping algorithm will start a distance D prior to the formation top in each source of data. The distance D is configurable for the dynamic depth warping algorithm process.

In one example, a formation top identified as formation A from the type log data is known to be at a depth of 1000 feet. The prognosis for the depth of formation A for a well being drilled is 1025 feet. Let:

$Depth_{FAT}$=Depth of Formation A in the Type Log 1502

$Depth_{FAA}$=Prognosis Depth of Formation A in the Active Well 1504

$D$=Distance prior to formation to begin correlation

Then $StartDepthT = Depth_{FAT} - D$ $StartDepthA = Depth_{FAA} - D$

Where $T$=Type Log $A$=Active Well

The dynamic gain in the range axis can be significantly different between the type log source 1502 and the active well source 1504. If this data is left unaltered, this would lead to unsatisfactory results during the correlation process at 1506. For example, the gamma API count for formation A could be 100 in the type log 1502 and 65 in the well 1504 being drilled. The radioactivity emanating from the formation is the same, but the measuring equipment can be calibrated differently.

To account for the difference in gain measurements, the process automatically gains the data at step 1604 from the type log 1502 to be comparable with the gain in the well being drilled. It will be appreciated that the active well data 1504 could also be gained to the type log data 1502.(In alternative embodiments, other algorithms may be used to determine gain such as using a median value for each curve.) Thus:

$A$=Curve data from the active well $T$=Curve data from the type log

Then:

$$A_{sum} = \sum_{i=0}^{n} A_i$$

$$A_{ave} = \frac{A_{sum}}{n}$$

$$T_{sum} = \sum_{j=0}^{m} T_j$$

$$T_{ave} = \frac{T_{sum}}{m}$$

$$\text{Gain} = \frac{A_{ave}}{T_{ave}}$$

$$T_{gained} = \sum_{j=0}^{m} T_j * T_{ave}$$

Figure 17:
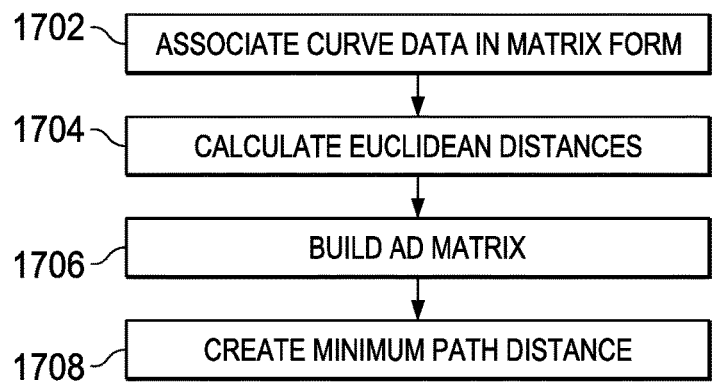
FIG. 17 is a flow diagram illustrating the dynamic depth warping algorithm.

After the data is dynamically gain adjusted, the dynamic depth warping algorithm is applied at step 1606. The dynamic depth warping algorithm is generally illustrated in FIG. 17. Dynamic Depth Warping (DDW) is used for making the best association between curves defined by type log data 1502 and curves from active well data 1504. The DDW algorithm is ideal for this application because it makes associations that consider the entire region of depth. The DDW algorithm finds the best correlation between the two curves defined by the log data 1502 and the well data 1504 as illustrated in FIG. 17. Initially, the curve data for both the type log and the active well are associated in matrix form at step 1702. Next, Euclidean distances are calculated from each point in the curve data at step 1704. This information is used to build an absolute distance matrix at step 1706. The minimum path distance may then be determined at step 1708 from the information within the absolute distance matrix created at step 1706.

The process for associating the curve data in a matrix format at step 1702 first defines the data as follows:

Let $X=A$(curve data from active well)

Let $Y=T_{gained}$(gained curve data from type log)

For simplicity, consider the following set of curves for X and Y:

$X$=[1,1,2,3,2,0];

$Y$=[0,1,1,2,3,2,1];

The X and Y curves are more particularly illustrated in FIG. 18. The X curve is represented by line 1802 while the Y curve is represented by line 1804. In the present example the X curve is data from the active well while the Y curve is the gained curve data from the type log.

The process of calculating the Euclidean distance between each point within the two selected curves at step 1704 involves calculating the distance from each point in the Y array to each point in the X array. This will provide a matrix of distances as illustrated in FIG. 19. The values for the array are determined by the equation:

$$Dist_{i,j} = \sum_{i=1}^{m} \sum_{j=1}^{n} (X_i - Y_j)^2$$

Using the previous defined values for the X and Y curves, this produces the matrix as illustrated in FIG. 19.

The matrix of FIG. 19 is populated in the following manner. Beginning with block 1902, $X_i$ is equal to 1 and is associated with each of the values for $Y_j$ (0, 1, 1, 2, 3, 2, 1). By substituting each of these values of $Y_j$ into the above equation with a value of 1 for $X_i$, the solutions for $Dist_{i,j}$ are obtained as follows: 1, 0, 1, 4, 1, 0, 0. These values are placed in column one of the matrix beginning with entry 1902 and ending with entry 1904. The remaining entries for the remaining columns of the matrix are generated using the remaining values for $X_i$ for each of the other columns in a similar manner.

Referring now back to FIG. 17, using the Euclidean distances determined at step 1704, an accumulated distance (AD) matrix is generated at step 1706. The process, which is generally illustrated in the flow diagram of FIG. 20, begins at start point (0, 0) and the edges, which are special cases. First, the start point (0, 0) is initialized at step 2002.

$$AD_{(0,0)} = Dist_{(0,0)}$$

Next, row 0 is initialized at step 2004.

$$\sum_{i=1}^{n} AD_{(0,i)} = Dist_{(0,i)} + AD_{(0,i-1)}$$

Column 0 is further initialized at step 2006.

$$\sum_{j=1}^{m} AD_{(j,0)} = Dist_{(j,0)} + AD_{(j-1,0)}$$

An initial table element (i, j) is calculated at step 2008 using the minimum value of these three cells: (i−1, j−1), (i−1, j) and (i, j−1):

$$\sum_{i=1}^{n}\sum_{j=1}^{m} AD_{(i,j)} = Dist_{i,j} + \min[(AD_{(i-1,j)}), (AD_{(i-1,j-1)}), (AD_{(i,j-1)})]$$

After determining the first table element, inquiry step 2010 determines if there is a next table element for determination according to the above equation. If so, the table element is incremented to the next values at step 2012, and the table element for the next element is calculated at step 2008. If inquiry step 2010 determines no further table elements exist, the matrix is completed at step 2014. The resultant matrix according to the previously defined curves for X and Y is illustrated in FIG. 21.

Figures 21, 22, 23:
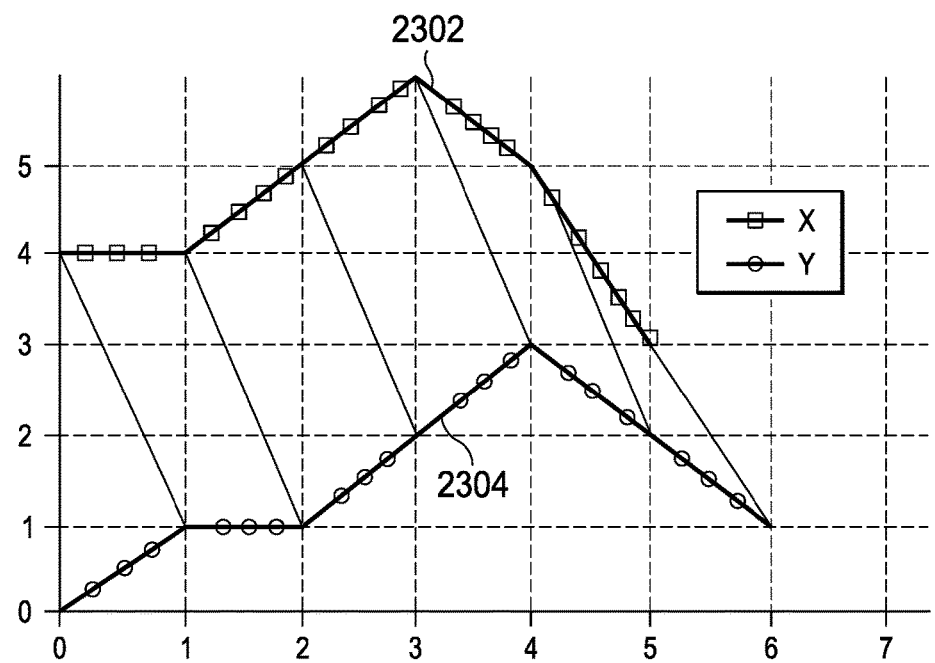
FIG. 21 illustrates an accumulated distance matrix.
FIG. 22 illustrates the minimum distance path within an accumulated distance matrix.
FIG. 23 illustrates two curves with associations.

Referring now back to FIG. 17 and FIG. 22, once the accumulated distance matrix has been generated, matrix is used to determine a minimum distance path at step 1708. The path will start at entry (0, 0) 2202 and end at entry (n, m) 2204. The path is chosen using an algorithm which starts at point (m,n) and works backward toward point (0,0). At point (m,n) the algorithm looks for the lowest value in the preceding cells (see Error ! Reference source not found.):

$$Path_1 = min(cell_{(m-1,n-1)}, cell_{(m-1,n)}, cell_{(m,n-1)})$$

When this cell has been determined the algorithm looks for the minimum value in the preceding cells to this cell as shown above. This process continues until the cell chosen is point (0,0).

The minimum distance path for the above-referenced matrix comprises all of the shaded entries between entry 2202 and entry 2204 of FIG. 22. The path is defined by:

$$Path = [(0,0),(0,1),(1,1),(1,2),(2,3),(3,4),(4,5),(5,6)]$$

The path shows the optimum warping path which minimizes the sum of distances along the path. The set of (x, y) pairs represent the best association between the two curves, which can now be used for interpretation and visualization.

Referring now to FIG. 23 there are illustrated the original curves consisting of the X curve 2302 and the Y curve 2304, but with the curve data from the type log (X) offset higher than the active well log (Y). This illustrates the manner in which the association lines 2306 can be more easily seen.

When large sets of data are used for the X and Y curves, the number of possible warping paths through the matrix can be exponentially large. In order to overcome this issue, a number of different restrictions may be placed on the number of warping paths through the matrix to reduce the total number of paths to a reasonable number for consideration by the algorithm.

Figure 24:
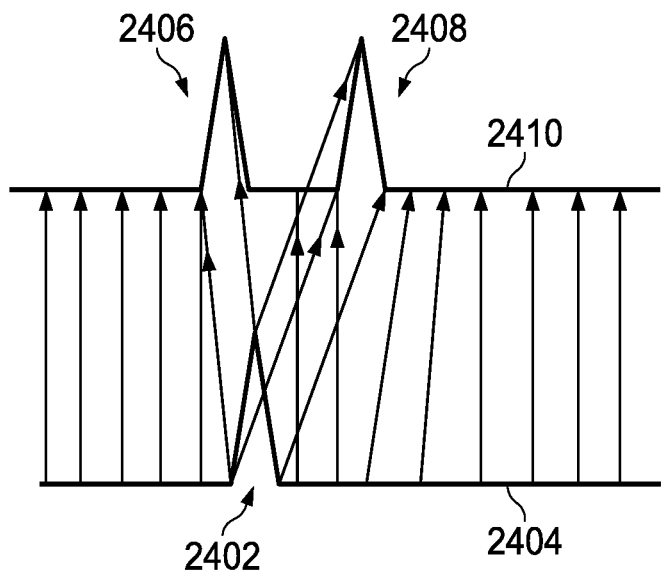
FIG. 24 illustrates a case where a single feature matches multiple features between two curves.
Figure 25:
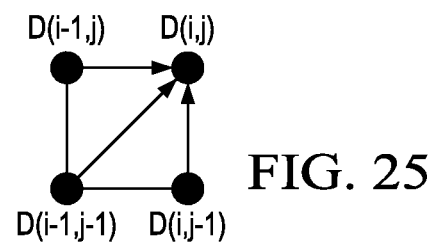
FIG. 25 illustrates the adjacent cells considered when building a warping path.

A first restriction relates to monotonicity. The warping path cannot go back in "depth" index. This guarantees that features are not repeated. Without this monotonicity restriction, a feature in one curve could be associated more than once in other curves as illustrated in FIG. 24. In this case, feature 2402 of data set 2404 is being matched to features 2406 and 2408 of data set 2410. The monotonicity restriction is accomplished by considering only the cells illustrated in FIG. 25 when building the warping path. These include cells D(i, j), D(i, j−1), D(i−1, j) and D(i−1, j−1) and are all adjacent.

Figure 26:
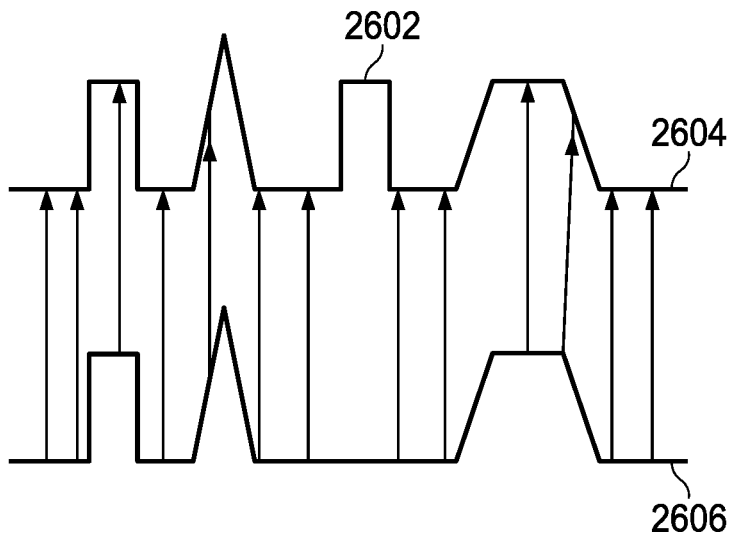
FIG. 26 illustrates a case where important features are skipped between two curves.

A further restriction considered is continuity. The warping path does not jump in the "depth" index. This guarantees that important features are not omitted as demonstrated in FIG. 26. In this case, feature 2602 has been skipped in the data set 2604 when being warped with data set 2606. The continuity restriction is accomplished by ensuring indexes i and j are incremented in steps of no more than one.

Figure 27:
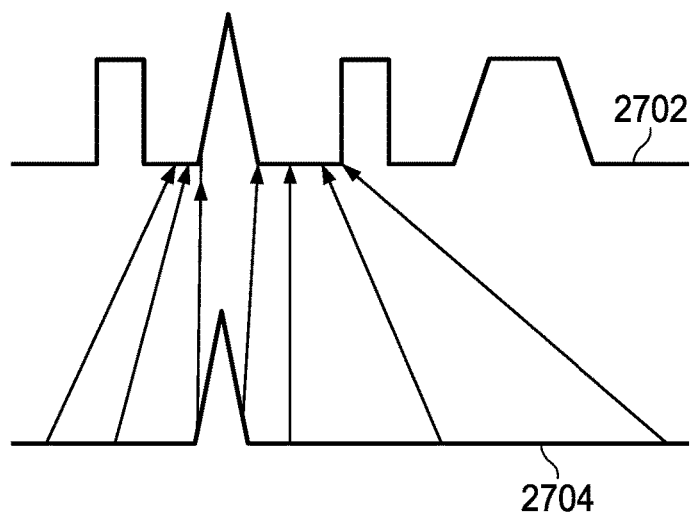
FIG. 27 illustrates a case where alignment considers only part of the data between two curves.

A third restriction involves the use of boundary conditions. To ensure that the warping path does not consider only partial sequences, the warping path starts at the bottom left of the matrix and ends at the top right of the matrix. This assists in avoiding a circumstance such as that illustrated in FIG. 27, wherein the alignment process considered only a portion of data set 2702 when being compared with data set 2704.

Figure 28:
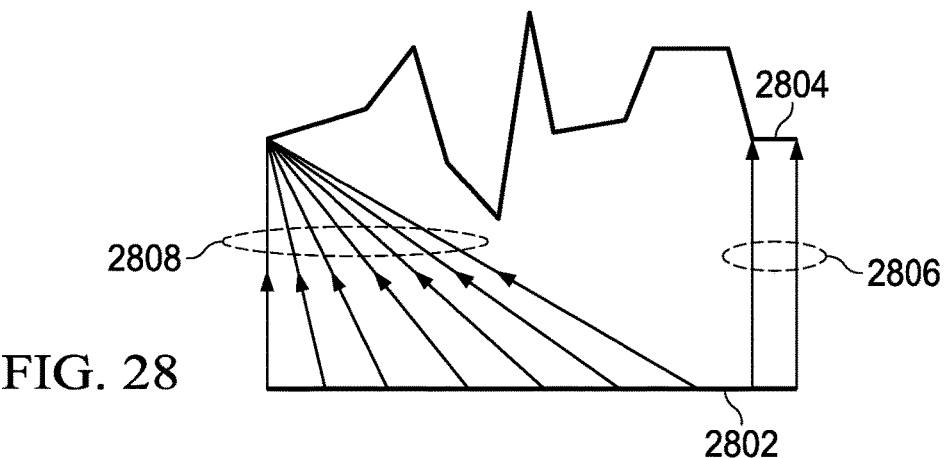
FIG. 28 illustrates a case where a warping path wanders too far.
Figure 29:
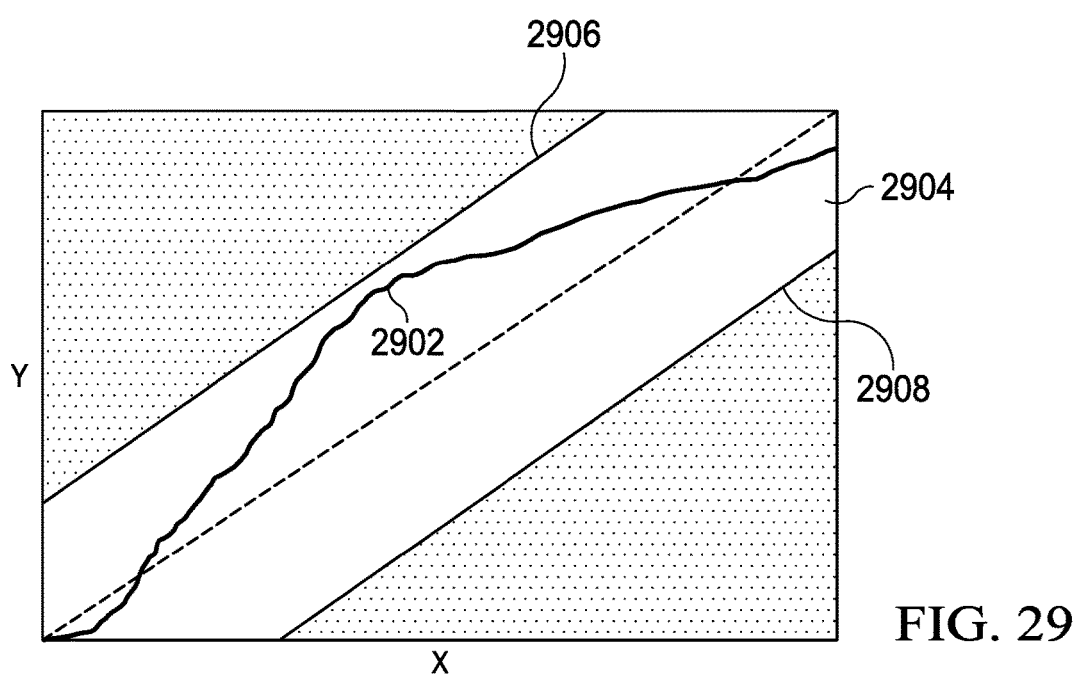
FIG. 29 illustrates a warping path with warping window.

Another restriction involves the use of warping windows. The warping window ensures the warping path does not wander too far from the predicted range. This guarantees that the warping path does not try to skip two different features and become stuck at similar features. FIG. 28 illustrates a case where the warping path wanders. Data set 2802 and for warping path comparisons 2806 the process proceeds normally. However, at warping path comparison 2808, the process veers too far from the previous warping processes 2806 skipping over a large portion of the data of data set 2804. The warping window is configurable and symmetric around the matrix diagonal as illustrated in FIG. 29 such that features which may be missing due to geological faulting can be ignored. The warping path 2902 remains within the warping window 2904 and its upper bound 2906 and lower bound 2908. A wider warping window 2904 allows for larger faults but is more easily taken off track. A more narrow warping window 2904 keeps the warping path 2902 moving forward in formations where there is more control but less tolerance of true faults.

Figure 30:
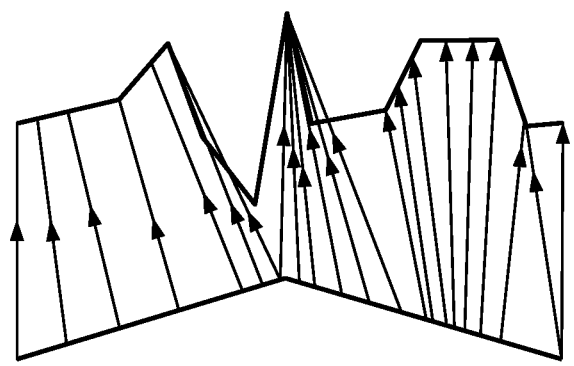
FIG. 30 illustrates a case where short paths are matched with long paths between two curves.

A final restriction uses slope constraints. Slope constraints ensure that the warping path will not become too steep or too shallow. This guarantees that very short parts of the sequences are not matched to very long parts of the sequences. An example of a non-slope constrained warping is shown in FIG. 30. The use of slope constraints prevent the longer sections of path from being matched with the shorter paths.

Adjustments may also be made to the warping algorithm based upon marker approvals. There are many paths through a warping matrix. There are more paths existing than can be evaluated in a timely manner especially as the drilling depth increases. However, the degree of uncertainty can be greatly reduced by pre-approving or selecting a correlation point which represents a point of truth.

Figure 31:
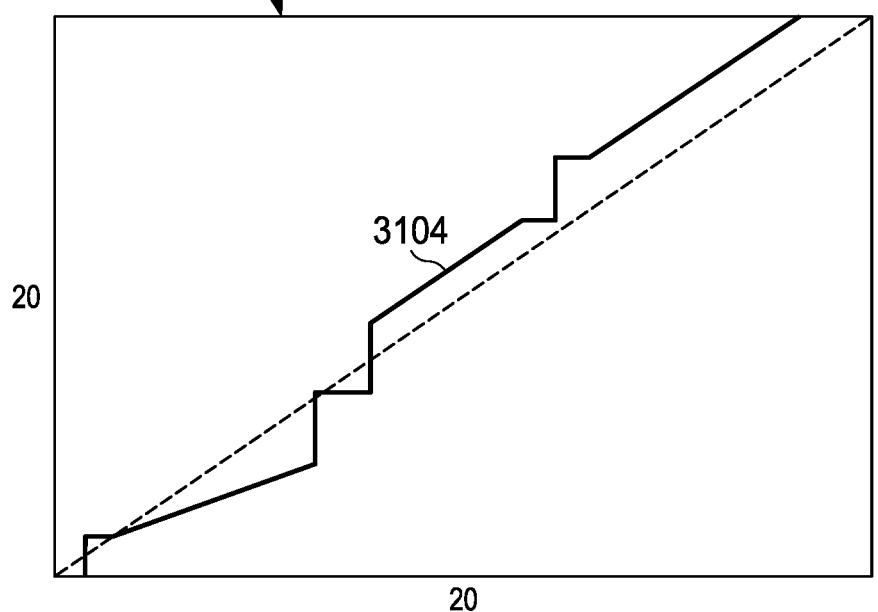
FIG. 31 illustrates a warping path within a 20 foot warping window.
Figure 32:
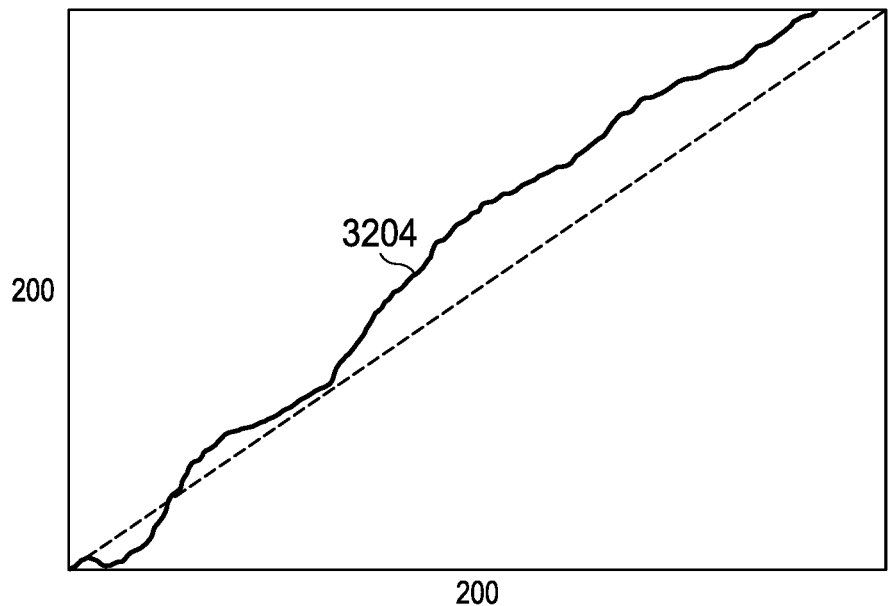
FIG. 32 illustrates a warping path within a 200 foot warping window.

Referring now to FIG. 31, imagine a scenario where correlation proceeds past the start point for 20 feet. The warping window 3102 is 20×20 and the warping path 3104 may appear as illustrated. Referring now to FIG. 32 after drilling for 200 feet, the matrix becomes 200×200 with a warping path 3204 that takes the minimum distance as illustrated.

Figure 33:
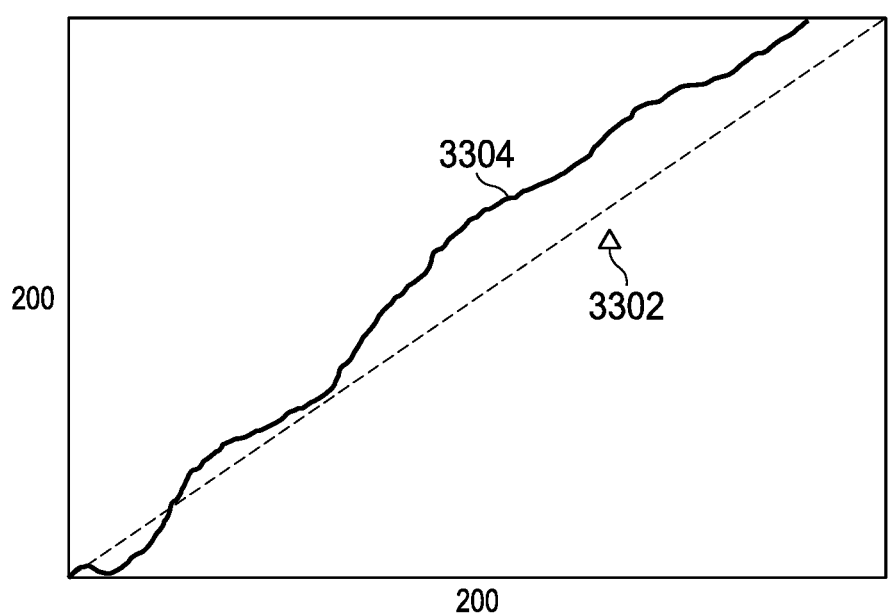
FIG. 33 illustrates a 200 foot warping window including an approved marker.

Referring now to FIG. 33, if during this range of drilling, a marker can be seen and verified, the marker may be approved and become an approved marker 3302 that is associated with the original warping path 3304. The approved marker 3302 may or may not lie on the existing warping path 3304. In the example of FIG. 33, the approved marker 3302 is outside of the warping path 3304.

Figure 34:
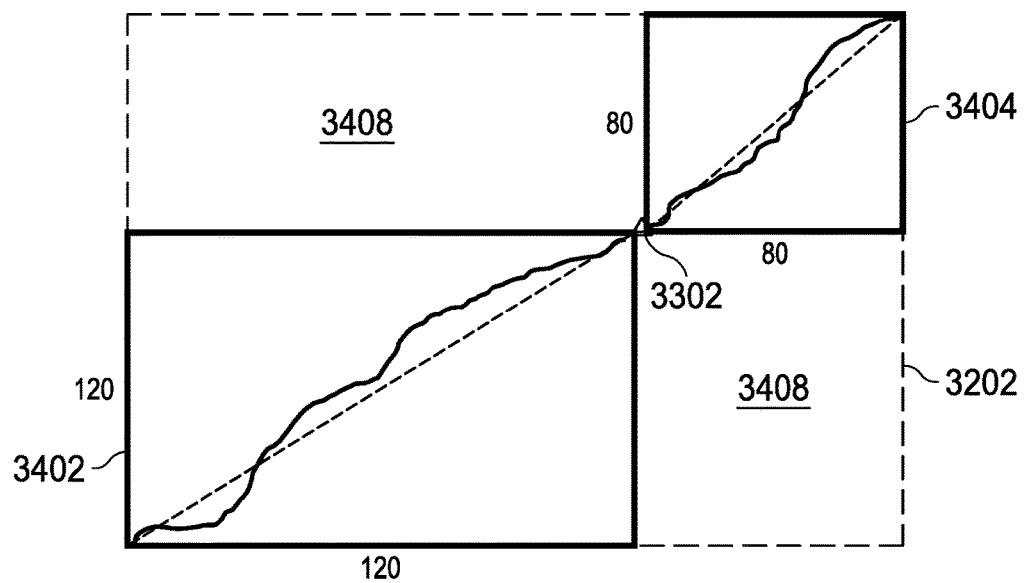
FIG. 34 illustrates a partitioned 200 foot warping window.

The larger 200×200 warping window 3202 can be split into two smaller windows as illustrated in FIG. 34. This adjusts the path based upon the known approved marker 3302. The 200×200 warping window 3302 is broken down into a 120×120 warping window 3402 and an 80×80 warping window 3404. The 120×120 warping window 3402 goes from the starting point (0, 0) to the approved marker 3302 at (120, 120). The 80×80 warping window 3404 begins at the approved marker 3302 at (120, 120) and ends at the original ending point of the 200×200 warping window 3202. This adjusts the warping path based upon the truth data (the known, approved marker 3302). Another benefit of this partitioning is that the dynamic depth warping algorithm will use less processing time since it does not have to consider the areas 3408 outside of the new warping windows.

Figure 35:
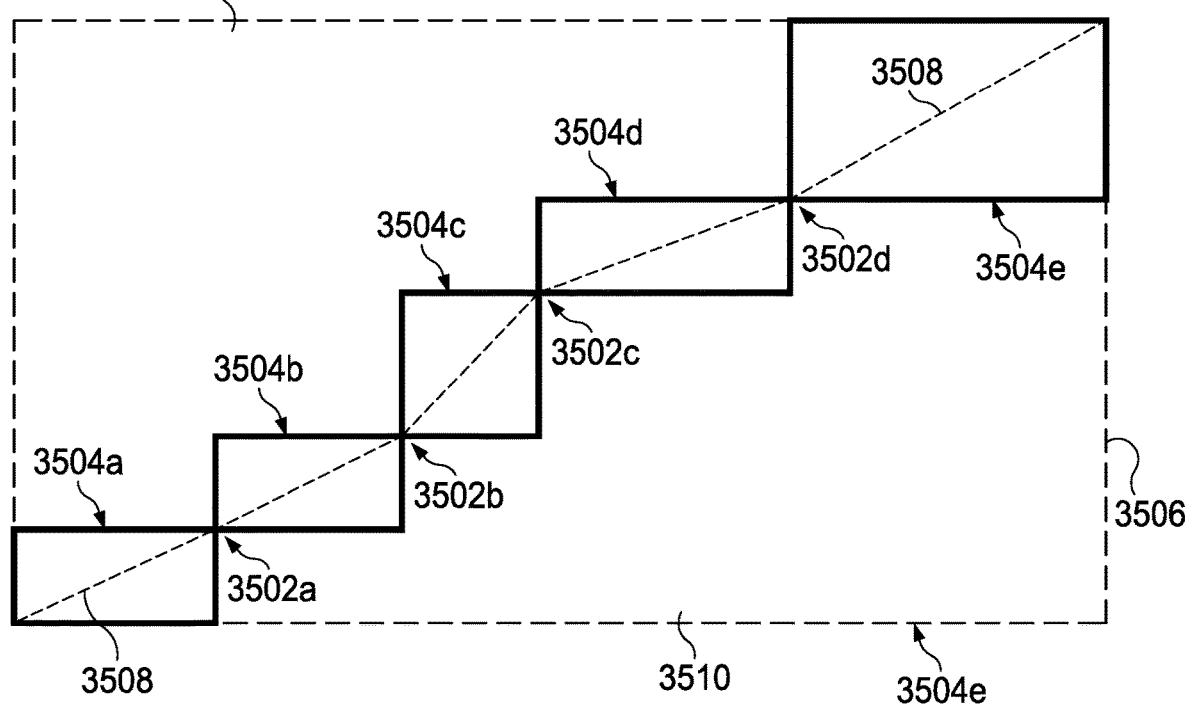
FIG. 35 illustrates a large drilling area including a plurality of working windows.

Over the course of a large drilling area, the benefit of partitioning the warping windows based on approved markers 3302 becomes more apparent as illustrated in FIG. 35. In this example, approved markers are located at points 3502. A number of warping windows 3504 are established within the original warping window 3506 using the approved markers 3502. Thus, initial warping window 3504a goes from the starting point 3508 to approved marker 3502a. Warping window 3504b goes from approved marker 3502a to approved marker 3502b. The rest of the warping windows 3504 are produced in a similar fashion. As can be seen, large areas 3510 of the original warping window 3506 now lie outside of the new warping windows 3504 and no longer have to be processed. The dynamic depth warping algorithm can, and should, create a warping path even without approved markers 3502. The resultant path is always the most optimized path across the region, given the boundary conditions.

Figure 36:
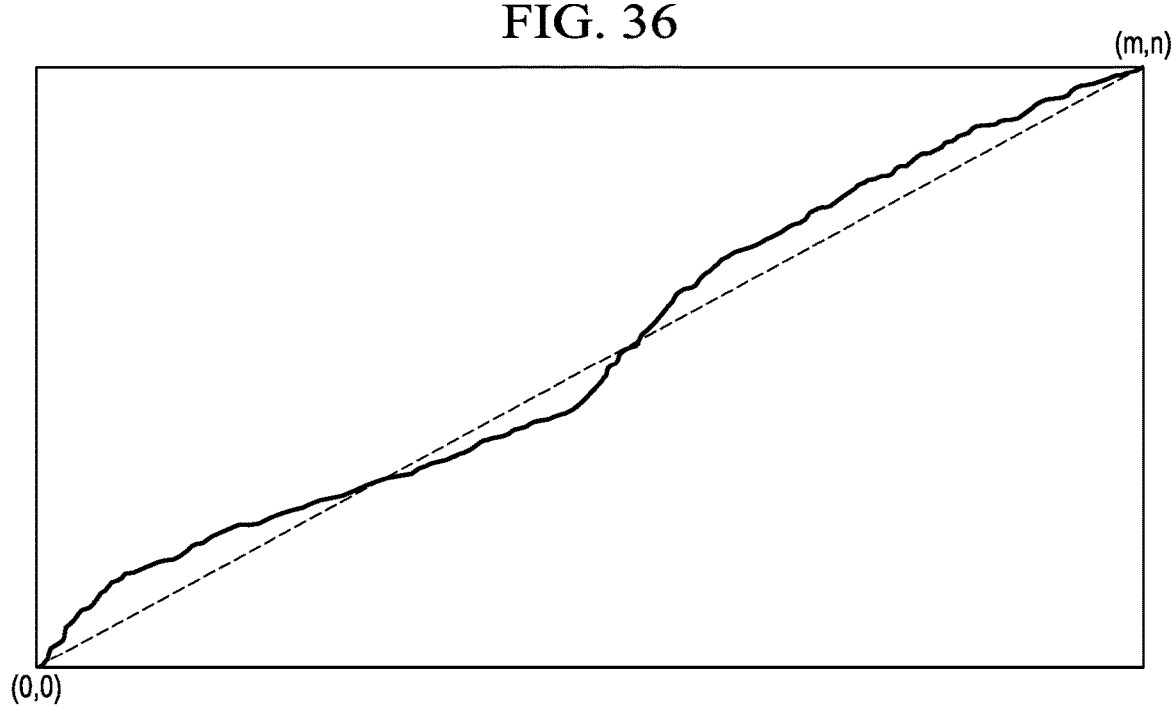
FIG. 36 illustrates a point to point warping window.
Figure 37:
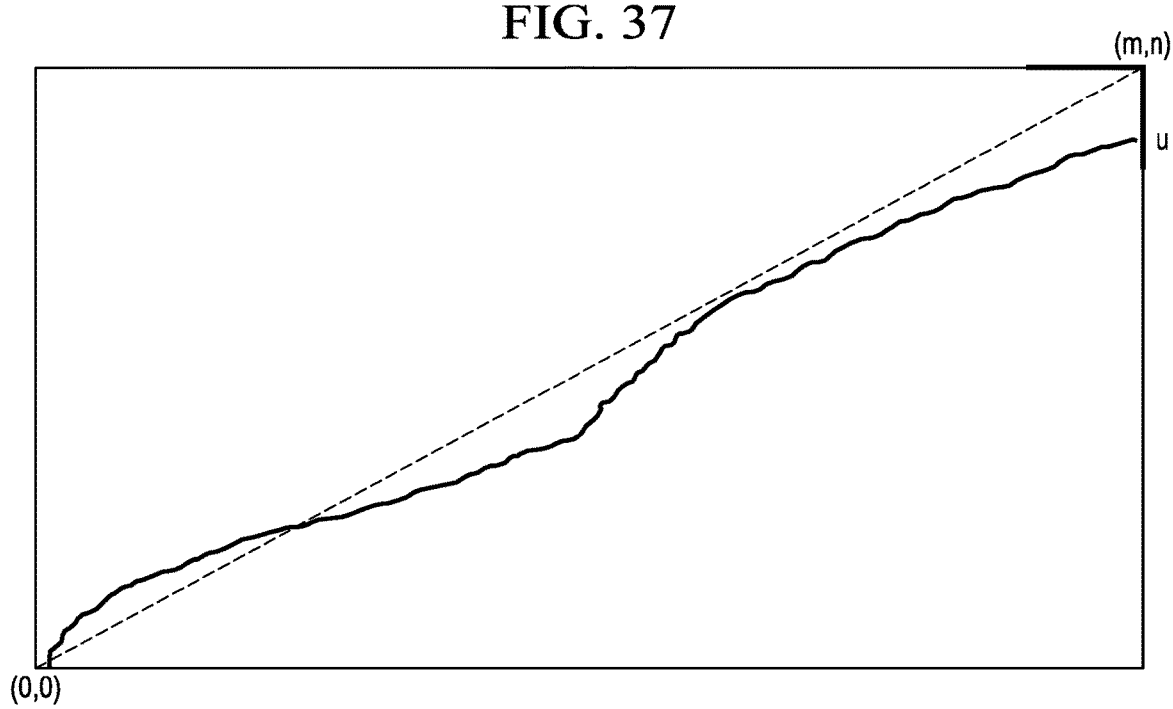
FIG. 37 illustrates a point to area warping window.

Two types of warping windows are used depending on where the warping window exists in the drilling area. These include point-to-point warping windows and point-to-area warping windows. The point-to-point warping window is used when the start and end points are well-known. The points to area warping window is used when the starting point is well-known but the endpoint has uncertainty. The point-to-point warping window is used for areas between approved markers. The point-to-area warping window issues primarily in the leading edge of drilling. The uncertainty value for the ending area is set to account for faulting, thinning and thickening in the formation. A point-to-point warping window is a matrix where the warping path begins at point (0, 0) and ends at a second point (m, n) as illustrated in FIG. 36. A point-to-area warping window is a matrix where the warping path begins at a point (0, 0) and ends within an area as illustrated in FIG. 37. This area lies along two lines (m, n-u) . . . (m, n) and (m-u, n) . . . (m, n), where u is an uncertainty value.

Using the above described dynamic depth warping process type log data and actual drilling well data may be compared in real time to provide better dynamic formation detection by dynamically correlating formation patterns between a type log and actively drilling well.

Figure 38:
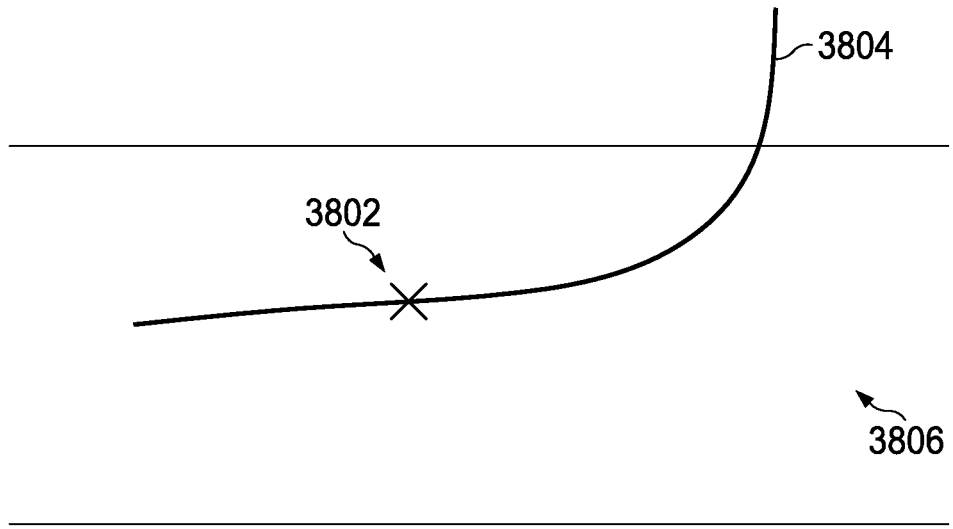
FIG. 38 illustrates a lateral drilling process.

In another embodiment, lateral positions of the BHA can also be detected. Referring now to FIG. 38, while drilling in the lateral drilling within a formation, direction markers 3802 are used to determine where the BHA is relative to a geologic target. These markers 3802 are more complex to interpret as the drilling of the wellbore 3804 is happening near perpendicular relative to the logged TVD section perspective while drilling in a lateral well. While the wellbore 3804 is near perpendicular, the wellbore 3804 is never perfectly perpendicular for any significant period of time due to the angulation of the subsurface geology including faulting and pinching of layers of reservoir rock. Additionally, the rotary build and walk trend of the BHA and the sliding of mud motors or well deviation by rotary steerable tools to compensate cause the BHA, wellbore and sensors to traverse up and down within the target formations 3806. Finally, geometry of the wellbore 3804 can be harshly deviated as a result of crossing faults and deflecting off of harder rock layers. All these factors lead to traversing up and down within the formation and require continuous analysis to recognize where the borehole currently is located to correct accordingly and optimize hydrocarbon production while reducing risk.

Figure 39:
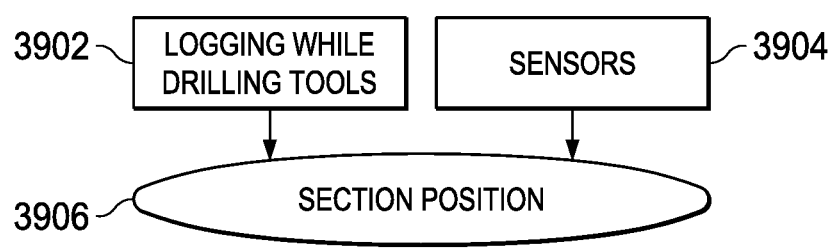
FIG. 39 illustrates a manner for determining position during a lateral drilling process.

Referring not to FIG. 39, analysis of the position 3906 within a section is done using Logging While Drilling tools 3902 and sensors 3904 to gain feedback using inputs on gamma radiation or resistivity characteristics of the surrounding formation 3806 (FIG. 38) for example. Many logging tools are available at a variety of cost and complexity levels but functionally, the evaluation is performed similarly using offset logs or references for comparison to evaluate where the borehole is relative to characteristics seen in previous horizontal or vertical wells. Additionally, delayed information can be leveraged using mud logging analysis of the drilling cuttings, fluids and gas seen at surface after circulating up around the pipe. Real-time feedback using drilling dynamics and performance such as ROP and MSE are additional references that can provide additional information.

With this analysis there are large opportunities for errors in interpretation. Some rock formations have very little characteristic to help reach a definitive interpretation and trends can be sinusoidal in nature leading to difficulty recognizing if the trend indicates the borehole 3804 is traversing one way or another. These difficulties are further compounded by low resolution indication of the shape of the wellbore 3804 defined by surveys taken only every 90 ft for example using a constant arc to define the shape of the wellbore 3804 as described previously. TVD corrected logs are also generally limited in frequency to only being provided when a new survey is available to leverage the minimum curvature result to map the sensor information.

Within the Surface Steerable System described herein above, many of these problems are solved using a mixture of algorithms mentioned previously to more accurately map sensor information 3904 in real time to the more accurate shape of the well and ultimately to the correct TVD progression. Additionally, algorithms designed to recognize patterns automatically that would be difficult or impossible for a human to interpret in a timely manner are used to interpret in the data in real-time or near real-time. Using computer processing to accelerate evaluation, the surface steerable system can not only account for the true TVD placement of logs but can also search many variations of formation dip interpretation to find the best possible or most likely match of recent logging feedback.

Figure 40:
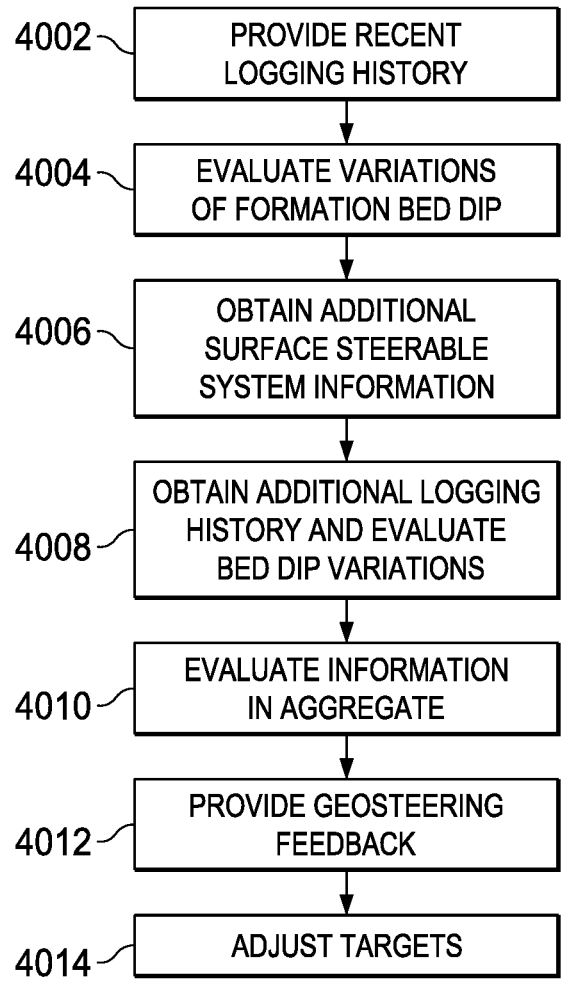
FIG. 40 illustrates a flow diagram more particularly illustrating the manner of processing the data during a lateral drilling process.

Referring now to FIG. 40 there is a flow diagram more particularly illustrating the manner of processing the data. At a first step 4002, the system can provide a recent logging history that has been TVD corrected using the wellbore shape provided by the BHE (Bore Hole Estimator). The recent history can be selected manually, varied to establish most consistent matching, or can be determined by known inflection points or events recognized by the system. For example, the system could use a 500 ft. history defined by the user, or the evaluation length could be limited to only extend back to a geologic fault recognized by the system.

At a second step 4004, the system can evaluate variations of the formation bed dip in a iterative approach to look for most probably or most closely matched characteristics. Although the well plan is expected to be similar to the bed dip of the formation, it is unlikely to be exact. For that reason the system might adjust the TVD referenced offset log to a variety of bed dip assumptions. This will stretch and compress characteristics of the offset logs section profile. By using a computer to perform this iterative function in combination with the formation pattern recognition mentioned previously, a series of most likely candidates and a best match candidate can be presented to the geologist, geosteering or drilling personnel in real-time or near real-time. The variation of bed dip resolution and range of investigation can be automatically or manually set and could be set to consider, for example, +/−5 degrees of well plan in 0.01 degree increments.

In a third step 4006 and 4008, the system can repeat the first two steps with additional information contained within the surface steerable system such as additional logging information from downhole tools, mudlogger feedback or drilling dynamics tracking of the system. For example it might be considered far more likely that the current trajectory is above bed dip angle if the rotary build tendency has shown that the BHA is building in rotation. With this consideration, the best match evaluation can be influenced to further bias the combined information.

At a forth step 4010, the system can evaluate all available information and individual best match results in aggregate to suggest the most probable statistical match with all information provided and convey this in a report or interactive user interface in real-time or near real-time to the geologist, geosteering or drilling personnel.

The resolution and variation of this investigation is only limited by time required for the processor system performing the function and will increase as the processors system performance is increased locally or by using networked resources. The evaluation of this interpretation can happen on the rig site, locally in the oil and gas operators office or in a cloud or server system geographically placed virtually anywhere to give flexibility in performance and security.

With this real-time or near real-time feedback, leveraging the more accurate shape of the wellbore provided by the surface steerable system, faster and more accurate geosteering feedback can be provided at step 4012. Additionally, this advanced information can be used to indirectly or directly cause the surface steerable system to adjust targets at step 4014 driven by economic or target driven decision making dynamically. This speed of reaction can further automate the horizontal drilling activity while simultaneously improving performance and accuracy.

As previously discussed, the ability to more accurately determine total vertical depth (TVD) between survey stations is desirable. As lateral drilling extends, the TVD error can accumulate and be 30+ feet in TVD error. Additional information may be utilized to better geosteer wells. Geologists obtain TVD corrected gamma logs based on purely survey station minimum curvature referenced TVD information. This conflicts with seismic based predictions and can cause confusion and bad decisions/geologic interpretations to be made. As shown in FIG. 41, the survey plan 4102 may be significantly different than the actual drill path 4104 after a rotation 4106 and slide 4010 wait as shown in FIG. 41 or a slide 4201 and rotate 4202 as shown in FIG. 42. This creates a TVD error 4110 that provides a different ending location for the BHA on the actual drill path 4104 from the survey plan path 4102.

Figure 43:
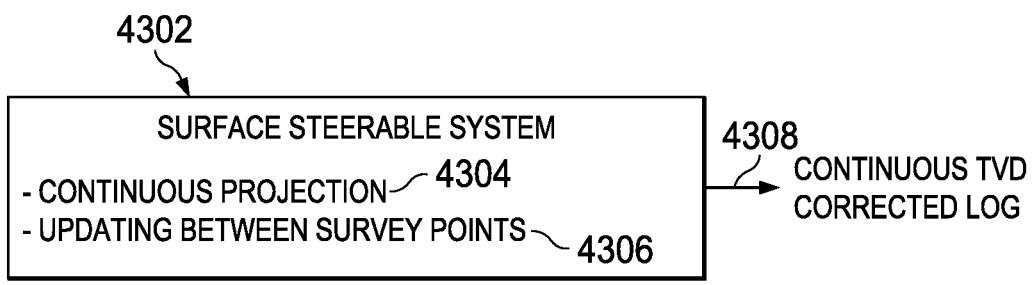
FIG. 43 illustrates the manner of a surface steerable system generating continuous survey projections.

Referring now to FIG. 43, the surface steerable system 4302 of the present disclosure continuously updates survey projections of the BHA position to the drilling bit through continuous projection functionality 4304. This enables provision of a real time TVD corrected gamma logs 4308 in the formation detection process. The limitations of TVD error are provided by a generation of a more accurate shape between survey points (survey markers) in the projection to the bit and to the bore hole estimator (BHE) through functionality 4306 that continuously updates path shape between survey points rather than using a minimum curvature method. This is critical as over a long lateral drilling process such as that illustrated above, the traditional minimum curvature method used between survey points can accumulate TVD errors that the BHE may provide additional information on the actual shape of the curve between the survey points. The error over a long lateral drilling process could be more than 30 feet in TVD and can cause big problems for geologists trying to figure out how to map the bit position to the geologic formation.

Figure 44:
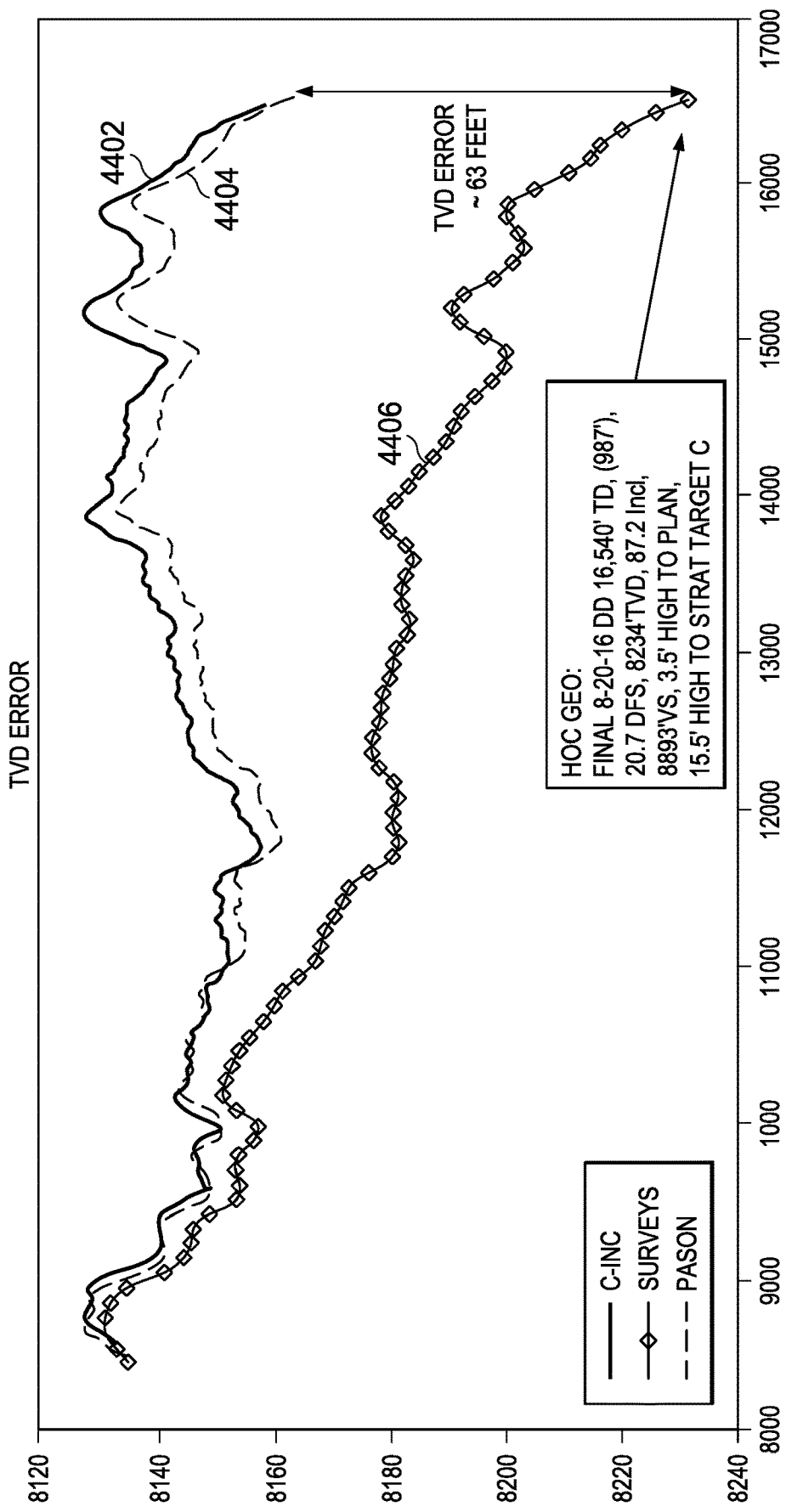
FIG. 44 illustrates TVD error for a first well.
Figure 45:
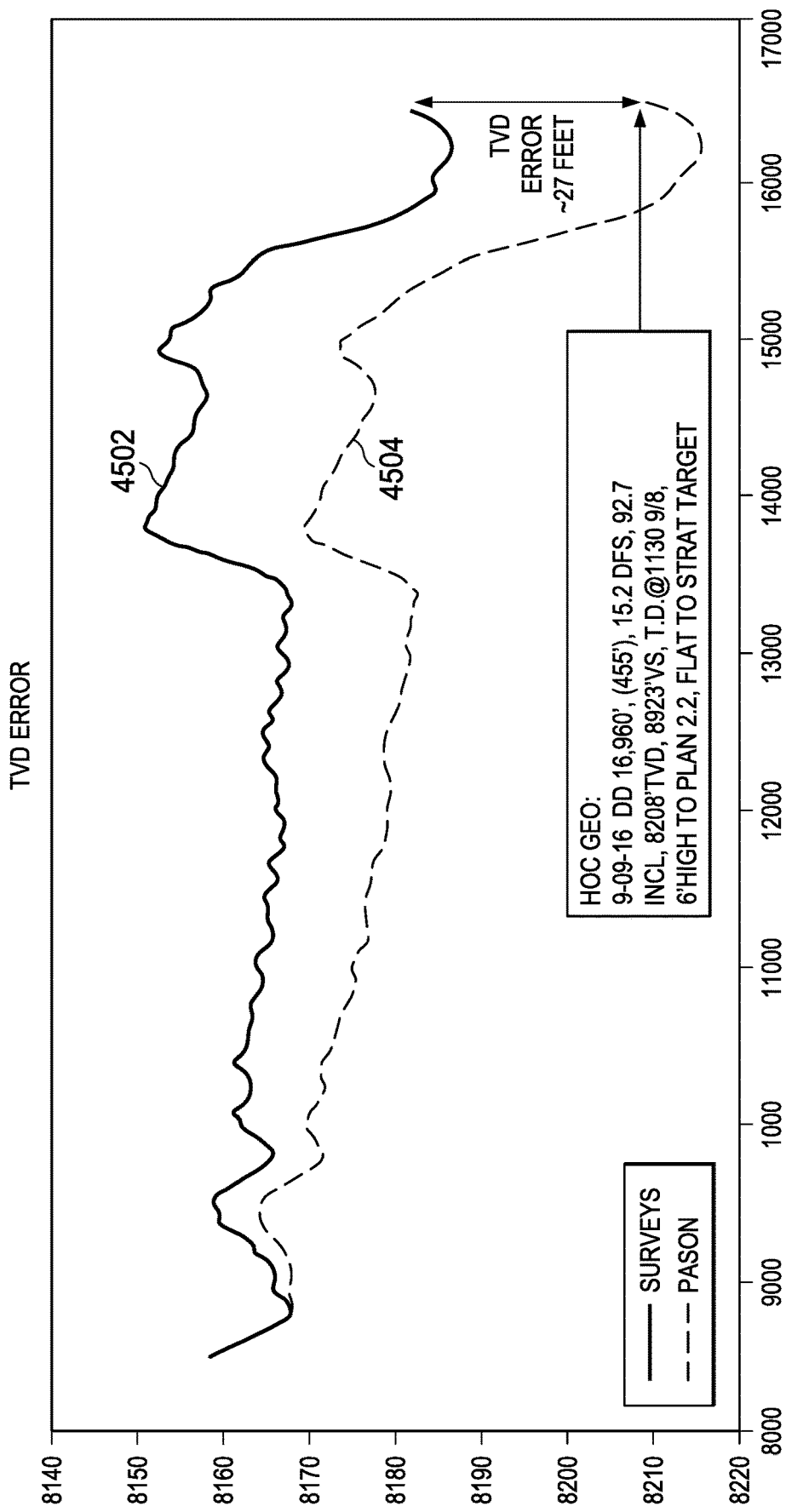
FIG. 45 illustrates TVD error for a second well.

Referring now to FIGS. 44 and 45 there is illustrated TVD error for two different wells. These wells provided significant TVD error due to survey spacing and build tendencies. The well in FIG. 44 had a TVD error of approximately 63 feet while the well in FIG. 45 had a TVD error of approximately 27 feet. Lines 4402, 4404 and 4502 represent the predicted survey TVD while lines 4406 and 4504 represent the actual survey TVD. Both wells demonstrated rotary build tendency but the well of FIG. 44 was much higher due to the use of small tools and this explains the relative error variation. Both wells also had TVD error due to practical limitations and survey frequency. If continuous projection and error tracking is used, leveraging running indicate when available and much more accurate TVD location is possible. Relative TVD error and interpretation variation confirms tracking is possible.

Figure 46:
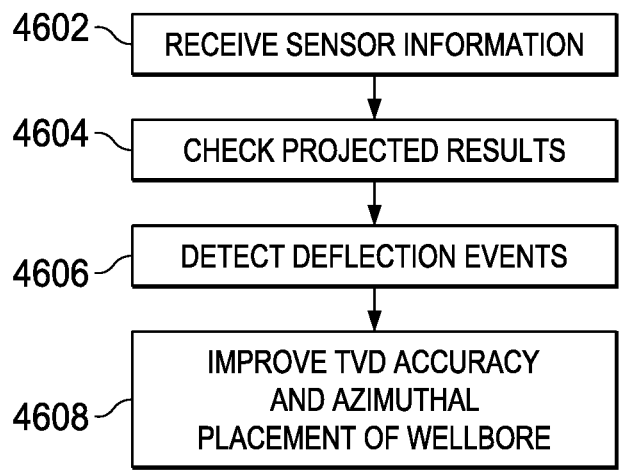
FIG. 46 illustrates a flow diagram for using sensor information to correct for TVD error.

The surface steerable system 4302 has the ability to leverage continuous inclination or azimuth readings to calibrate the BHE (bore hole estimator) and project to the bit accurately using a combination of sensor feedback, determined formation tendencies and other factors relating to TVD correction. The projection of continuous updates to the bit accomplished by the BHE allows for better placement accuracy both for instantaneous and for long term well placement. Referring now to FIG. 46, while the drilling is taking place sensor information 4602 from continuous inclination or continuous azimuth readings can be used to check at 4604 the projected results between survey stations and recognize deflection events automatically at 4606 or improve the accuracy of the TVD and azimuthal placement of the well bore at 4608. As mentioned previously, this additional spatial placement information can become critical when trying to maintain well spacing for production or collision avoidance benefits.

Figure 47:
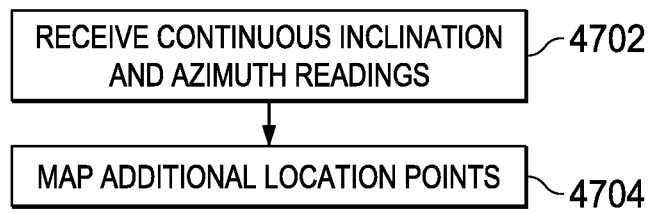
FIG. 47 illustrates a flow diagram for mapping additional location points between survey points using continuous inclination and azimuth readings.

Referring now to FIG. 47, the BHE provides multiple additional location points along the borehole between survey points and avoids the errors caused by minimum curvature calculations. Likewise, by receiving continuous inclination and azimuth readings at step 4702, the additional location points can be mapped at step 4704 independently or together to measured depth by the surface steerable system to allow for another form of additional location samples between survey points. Neither are perfect by nature of sensor noise and interpretation of data, but the two sources of additional information can be used together to correlate and increase confidence in the higher resolution wellbore placement and shape definitions.

Figure 48:
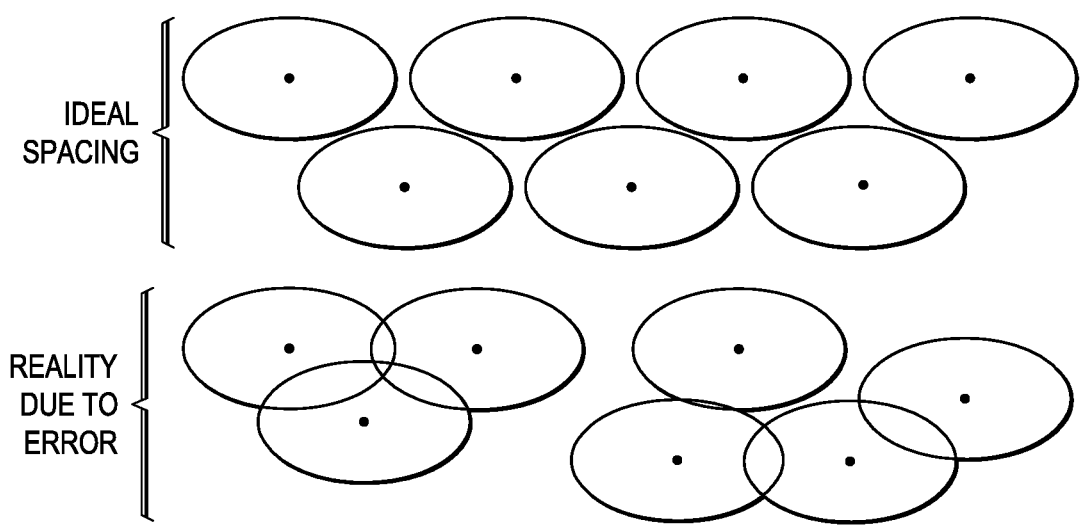
FIG. 48 illustrates well placement errors.

As mentioned earlier, errors in interpreted shape of the wellbore between survey stations can cause error in well placement interpretation as shown in FIG. 48. If these errors are random, they can be considered less than significant over the entire well but more often the errors accumulate in one direction. For example, if a well has a rotary build tendency caused by formation or build tendencies, and the same placement of slides to mitigate this build tendency or a long portion of the lateral the accumulation can be severe. The longer the lateral well path, the bigger the error becomes and can be so significant that geosteering references can become confusing and lead to falling outside the intended hydrocarbon producing reservoir. Official survey sample rate is a critical cause of this as is the relative placement of the surveys to the mitigation slides.

Within the surface steerable system, the error information for TVD and azimuthal placement relative to industry standard minimum curvature survey references can be tracked and provided as a log, as a cumulative or instantaneous error. This information can be used within geosteering tools to more accurately follow the well path or can be used to better manage relative spacing between wells. Additionally, this information can be used to establish a corrected survey table to give a more accurate placement of the well. Finally, as the surface steerable system determines the placement of slides and rotate sections, it is possible for the system to create a semi random pattern to avoid errors accumulating in any one direction relative to the limited sampling of traditional survey points.

It will be appreciated by those skilled in the art having the benefit of this disclosure that this system and method for determining BHA position during lateral drilling provides an improved manner of BHA tracking during lateral drilling. It should be understood that the drawings and detailed description herein are to be regarded in an illustrative rather than a restrictive manner, and are not intended to be limiting to the particular forms and examples disclosed. On the contrary, included are any further modifications, changes, rearrangements, substitutions, alternatives, design choices, and embodiments apparent to those of ordinary skill in the art, without departing from the spirit and scope hereof, as defined by the following claims. Thus, it is intended that the following claims be interpreted to embrace all such further modifications, changes, rearrangements, substitutions, alternatives, design choices, and embodiments.

What is claimed is:

1. A control system for drilling, the control system comprising:
   a processor having access to a memory media;
   the memory media storing instructions executable by the processor for controlling drilling direction of a bore hole assembly (BHA) during lateral drilling by a drilling rig of a wellbore through a formation, the instructions further comprising instructions for:
      accessing first logging data comprising logging data collected by the BHA over an evaluation length of the wellbore and corrected for true vertical depth (TVD) using a spatial path of the wellbore, wherein TVD represents a location with respect to both a vertical and horizontal axis;
      determining a first bed dip of the formation by iteratively applying different values of bed dip to the first logging data to determine the first bed dip as a value of bed dip best matching with the first logging data;
      determining a second bed dip by modifying the first bed dip based on drilling information collected during the lateral drilling, wherein the drilling information comprises at least one of: second logging data different from the first logging data, mud analysis data, and drilling equipment data;
      estimating a subterranean location of the BHA based on the first logging data, the second bed dip, and the drilling information, wherein the subterranean location is the location of the BHA with respect to both a vertical and horizontal axis; and
      using the subterranean location to modify steering of the lateral drilling of the wellbore.

2. The control system of claim 1, wherein the first logging data comprise gamma radiation logging data.

3. The control system of claim 1, wherein the spatial path of the wellbore is received from a bore hole estimator (BHE).

4. The control system of claim 3, further comprising instructions for:
   receiving inclination angle measurements and azimuth angle measurements from the BHA; and
   enabling the BHE to use the inclination angle measurements and azimuth angle measurements to estimate the spatial path of the wellbore.

5. The control system of claim 1, wherein the instructions for determining the first bed dip by iteratively applying different values of bed dip to the first logging data further comprise instructions for:
   iterating the values of bed dip in 0.01 degree increments.

6. The control system of claim 1, wherein the drilling equipment data includes at least one of: rate of penetration (ROP), weight on bit (WOB), build rate, and rotary build tendency.

7. The control system of claim 1, wherein the instructions for using the subterranean location to modify steering of the lateral drilling further comprise instructions for:
   adjusting a drilling target of the wellbore.

8. The control system of claim 1, wherein the instructions for accessing the first logging data further comprise instructions for:
   receiving user input specifying the evaluation length.

9. The control system of claim 1, wherein the instructions for accessing the first logging data and determining the first bed dip further comprise instructions for:
   varying the evaluation length to determine the first bed dip.

10. The control system of claim 1, wherein the instructions for accessing the first logging data further comprise instructions for:
    defining the evaluation length based on predetermined inflection points in the logging data collected by the BHA.

11. A method for drilling, the method comprising:
    controlling drilling direction of a bore hole assembly (BHA) during lateral drilling by a drilling rig of a wellbore through a formation by a surface steerable control system, further comprising:
       accessing first logging data comprising logging data collected by the BHA over an evaluation length of the wellbore and corrected for true vertical depth (TVD) using a spatial path of the wellbore, wherein TVD represents a location with respect to both a vertical and horizontal axis;
       determining a first bed dip of the formation by iteratively applying different values of bed dip to the first logging data to determine the first bed dip as a value of bed dip best matching with the first logging data;
       determining a second bed dip by modifying the first bed dip based on drilling information collected during the lateral drilling by the surface steerable control system, wherein the drilling information comprises at least one of: second logging data different from the first logging data, mud analysis data, and drilling equipment data;
       estimating a subterranean location of the BHA based on the first logging data, the second bed dip, and the drilling information, wherein the subterranean location is the location of the BHA with respect to both a vertical and horizontal axis; and using the subterranean location to modify steering of the lateral drilling of the wellbore by the surface steerable control system.

12. The method of claim 11, wherein the first logging data comprise gamma radiation logging data.

13. The method of claim 11, wherein the spatial path of the wellbore is received from a bore hole estimator (BHE).

14. The method of claim 13, further comprising:
receiving inclination angle measurements and azimuth angle measurements from the BHA; and
enabling the BHE to use the inclination angle measurements and azimuth angle measurements to estimate the spatial path of the wellbore.

15. The method of claim 11, wherein determining the first bed dip by iteratively applying different values of bed dip to the first logging data further comprises:
iterating the values of bed dip in 0.01 degree increments.

16. The method of claim 11, wherein the drilling equipment data includes at least one of: rate of penetration (ROP), weight on bit (WOB), build rate, and rotary build tendency.

17. The method of claim 11, wherein using the subterranean location to modify steering of the lateral drilling further comprises:
adjusting a drilling target of the wellbore.

18. The method of claim 11, wherein accessing the first logging data further comprises:
receiving user input specifying the evaluation length.

19. The method of claim 11, wherein accessing the first logging data and determining the first bed dip further comprises:
varying the evaluation length to determine the first bed dip.

20. The method of claim 11, wherein accessing the first logging data further comprises:
defining the evaluation length based on predetermined inflection points in the logging data collected by the BHA.

* * * * *